(12) United States Patent
Takeda et al.

(10) Patent No.: US 11,432,192 B2
(45) Date of Patent: Aug. 30, 2022

(54) TERMINAL AND RADIO COMMUNICATION METHOD

(71) Applicant: NTT DOCOMO, INC., Tokyo (JP)

(72) Inventors: Kazuki Takeda, Tokyo (JP); Satoshi Nagata, Tokyo (JP); Xiaolin Hou, Beijing (CN); Huiling Jiang, Beijing (CN); Xin Wang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/906,113

(22) Filed: Jun. 19, 2020

(65) Prior Publication Data

US 2020/0322842 A1 Oct. 8, 2020

Related U.S. Application Data

(63) Continuation of application No. 16/086,723, filed as application No. PCT/JP2017/011084 on Mar. 21, 2017, now abandoned.

(30) Foreign Application Priority Data

Mar. 23, 2016 (JP) .............................. JP2016-059129

(51) Int. Cl.
*H04W 28/06* (2009.01)
*H04W 72/04* (2009.01)
(Continued)

(52) U.S. Cl.
CPC ........... *H04W 28/06* (2013.01); *H04L 1/1614* (2013.01); *H04L 5/0048* (2013.01);
(Continued)

(58) Field of Classification Search
CPC . H04W 28/06; H04W 72/04; H04W 72/0406; H04W 72/0446; H04L 1/1614;
(Continued)

(56) References Cited

U.S. PATENT DOCUMENTS 11,218,254 B2 * 1/2022 Fu .......................... H04L 1/1607
2011/0243066 A1 * 10/2011 Nayeb Nazar ........ H04L 1/1671
370/328

(Continued)

FOREIGN PATENT DOCUMENTS

WO 2014/186456 A1 11/2014
WO 2015023227 A1 2/2015
(Continued)

OTHER PUBLICATIONS

Office Action issued in Japanese Application No. 2018-507316; dated Mar. 30, 2021 (6 pages).
Qualcomm Incorporated; "TTI Shortening and Reduced Processing Time for DL Transmissions"; 3GPP TSG RAN WG1 #84, R1-160905; St. Julian's, Malta; Feb. 15-19, 2016 (4 pages).
Ericsson; "5G—Key Component of the Networked Society"; 3GPP RAN Workshop on 5G, RWS-150009; Phoenix, AZ, USA; Sep. 17-18, 2015 (3 pages).

(Continued)

*Primary Examiner* — Eunsook Choi

(74) *Attorney, Agent, or Firm* — Osha Bergman Watanabe & Burton LLP

(57) ABSTRACT

A terminal is disclosed that includes a receiver that performs, using a first time interval or a second time interval, a receiving process for downlink control information indicating a transmission direction per given time interval and a processor that determines the transmission direction based on the downlink control information. In other aspects, a radio communication method is also disclosed.

4 Claims, 27 Drawing Sheets

(51) Int. Cl.
*H04L 1/16* (2006.01)
*H04L 5/00* (2006.01)
*H04L 5/14* (2006.01)

(52) U.S. Cl.
CPC ........... *H04L 5/1469* (2013.01); *H04W 72/04* (2013.01); *H04W 72/0406* (2013.01); *H04W 72/0446* (2013.01)

(58) Field of Classification Search
CPC ... H04L 5/0048; H04L 5/1469; H04L 5/0082; H04L 5/0092; H04L 5/0044; H04L 5/1438; H04L 5/18; H04L 5/0053; H04L 5/0064; H04L 5/143
See application file for complete search history.

(56) References Cited

U.S. PATENT DOCUMENTS

| | | | |
|---|---|---|---|
| 2014/0269453 A1* | 9/2014 | Papasakellariou | H04W 72/0406 370/280 |
| 2014/0334400 A1 | 11/2014 | Chen et al. | |
| 2014/0341051 A1 | 11/2014 | Gaal et al. | |
| 2015/0036651 A1* | 2/2015 | Takeda | H04W 72/0453 370/330 |
| 2015/0124663 A1* | 5/2015 | Chen | H04L 1/0023 370/278 |
| 2015/0181588 A1* | 6/2015 | Song | H04L 1/1887 370/280 |
| 2015/0358998 A1* | 12/2015 | Golitschek Edler Von Elbwart | H04L 1/1812 370/280 |
| 2016/0197687 A1 | 7/2016 | Song et al. | |
| 2016/0270116 A1* | 9/2016 | Lin | H04W 72/1289 |
| 2016/0234860 A1 | 11/2016 | Shimezawa et al. | |
| 2017/0013565 A1 | 1/2017 | Pelletier et al. | |
| 2017/0055256 A1 | 2/2017 | Zhang | |
| 2017/0325227 A1 | 11/2017 | Li et al. | |
| 2019/0053243 A1* | 2/2019 | Lee | H04W 72/0406 |

FOREIGN PATENT DOCUMENTS

| | | |
|---|---|---|
| WO | 2015046054 A1 | 4/2015 |
| WO | 2015123203 A1 | 8/2015 |

OTHER PUBLICATIONS

NTT Docomo, Inc.; "5G Vision for 2020 and Beyond"; 3GPP RAN workshop on 5G, RWS-150051; Phoenix, AZ, USA; Sep. 17-18, 2015 (24 pages).
Catt; "System Analysis of UL TTI Shortening"; 3GPP TSG RAN WG1 #84, R1-160375; Malta; Feb. 15-19, 2016 (7 pages).
3GPP TS 36.300 V12.4.0; "3rd Generation Partnership Project; Technical Specification Group Radio Access Network Evolved Universal Terrestrial Radio Access (E-UTRA) and Evolved Universal Terrestrial Radio Access Network (E-UTRAN); Overall description; Stage 2 (Release 12)"; Dec. 2014 (251 pages).
International Search Report issued in PCT/JP2017/011084 dated May 30, 2017 (2 pages).
Written Opinion issued in PCT/JP2017/011084 dated May 30, 2017 (4 pages).
NTT Docomo; "Interference Mitigation Schemes for eIMTA"; 3GPP TSG RAN WG1 Meeting #72bis R1-131669 Chicago, USA, Apr. 15 -19, 2013 (6 pages).
European Search Report issued in the counterpart European Patent Application No. 17770183.6, dated Oct. 28, 2019 (19 pages).
Extended European Search Report issued in the counterpart European Patent Application No. 17770183.6, dated Mar. 12, 2020 (19 pages).
Qualcomm Incorporated; "Discussion on signaling details for TDD UL-DL reconfiguration"; 3GPP TSG RAN WG1 Meeting #76 R1-140439; Prague, Czech Republic, Feb. 10-14, 2014 (4 pages).
Qualcomm Incorporated; "Adaptive frame structure and DL-UL configuration for LAA"; 3GPP TSG RAN WG1 #83 R1-157044; Anaheim, USA, Nov. 14-22, 2015 (4 pages).
Office Action in counterpart Japanese Patent Application No. 2018-507316 dated Oct. 5, 2021 (4 pages).
Office Action in counterpart European Patent Application No. 17 770 183.6 dated Oct. 7, 2021 (6 pages).
Office Action issued in Chinese Application No. 201780018927.X; dated Jul. 30, 2021 (14 pages).
Office Action issued in Indonesian Application No. PID201808358; dated Jul. 22, 2021 (6 pages).
Office Action issued in Indonesian Application No. PID201808358; dated Oct. 29, 2021 (5 pages).
Office Action issued in Chinese Application No. 201780018927.X; dated Mar. 17, 2022 (12 pages).

* cited by examiner

| UPLINK-DOWNLINK CONFIGURATION | DOWNLINK-TO-UPLINK SWITCH-POINT PERIODICITY | SUBFRAME NUMBER | | | | | | | | | |
|---|---|---|---|---|---|---|---|---|---|---|---|
| | | 0 | 1 | 2 | 3 | 4 | 5 | 6 | 7 | 8 | 9 |
| 0 | 5ms | D | S | U | U | U | D | S | U | U | U |
| 1 | 5ms | D | S | U | U | D | D | S | U | U | D |
| 2 | 5ms | D | S | U | D | D | D | S | U | D | D |
| 3 | 10ms | D | S | U | U | U | D | D | D | D | D |
| 4 | 10ms | D | S | U | U | D | D | D | D | D | D |
| 5 | 10ms | D | S | U | D | D | D | D | D | D | D |
| 6 | 5ms | D | S | U | U | U | D | S | U | U | D |

FIG. 1

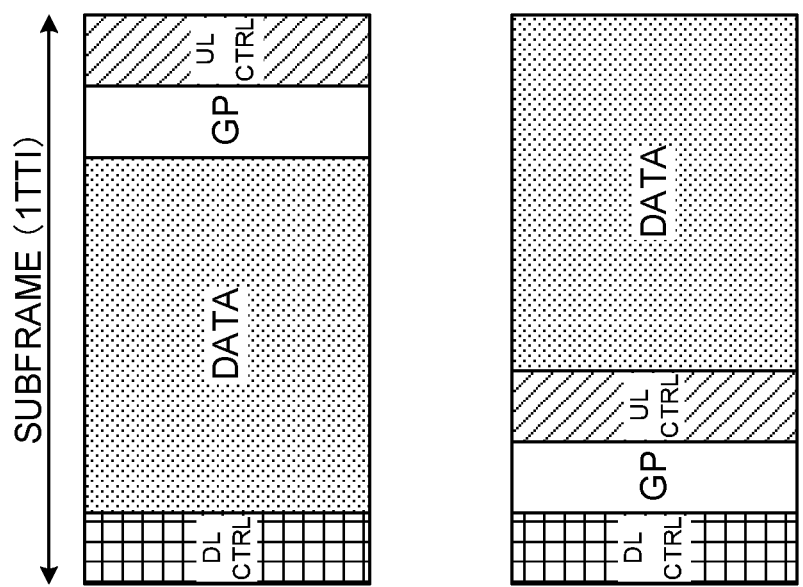

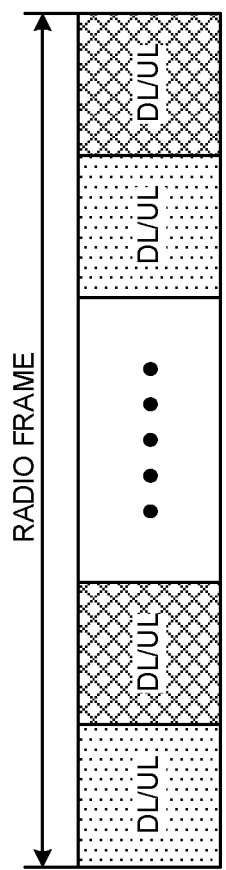
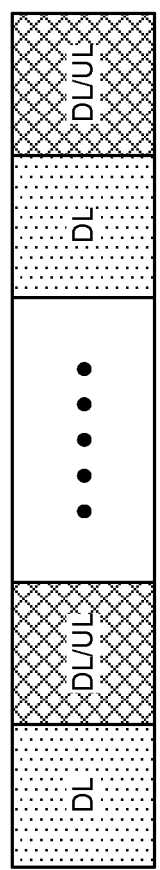
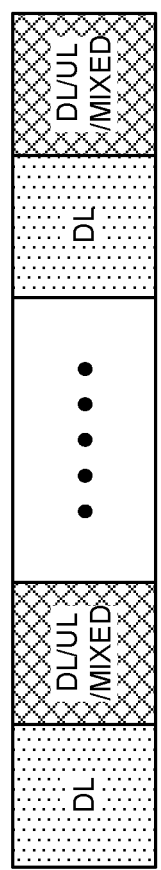
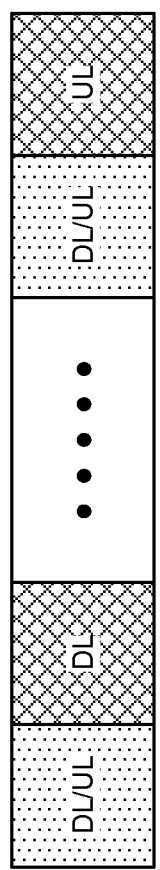

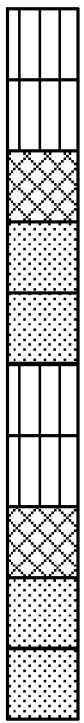
FIG. 8A  CASE 1: 1/5
FIG. 8B  CASE 2: 1/3
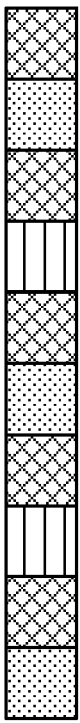
FIG. 8C  CASE 3: 1/2
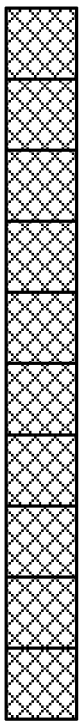
FIG. 8D  CASE 4: All
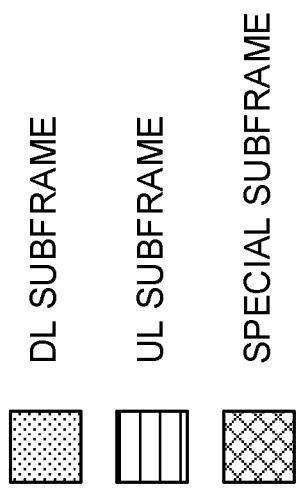

| TDD DU/UL LATENCY | TTI LENGTH (ms) | | | |
|---|---|---|---|---|
| | 1 | 0.5 | 0.25 | 0.125 |
| CASE 1-1: 1/5 (FIXED) | 5.567 / 6.2 | 5.567 / 6.2 TTIs | | |
| | | 2.78 / 3.1 | 1.39 / 1.55 | 0.696 / 0.775 |
| CASE 1-2: 1/5 (FLEXIBLE) | 5.567 | 5.567 TTIs | | |
| | | 2.78 | 1.39 | 0.696 |
| CASE 2-1: 1/3 (FIXED) | 5.18 / 5.9 | 5.18 / 5.9 TTIs | | |
| | | 2.59 / 2.95 | 1.30 / 1.48 | 0.65 / 0.74 |
| CASE 2-2: 1/3 (FLEXIBLE) | 5.18 | 5.18 TTIs | | |
| | | 2.59 | 1.30 | 0.65 |
| CASE 3-1: 1/2 (FIXED) | 5.1 / 6.7 | 5.1 / 6.7 TTIs | | |
| | | 2.55 / 3.35 | 1.28 / 1.675 | 0.64 / 0.84 |
| CASE 3-2: 1/2 (FLEXIBLE) | 5.1 | 5.1 TTIs | | |
| | | 2.55 | 1.28 | 0.64 |
| CASE 4: ALL (FLEXIBLE) | 4.8 | 4.8 TTIs | | |
| | | 2.4 | 1.2 | 0.6 |

Row label (y-axis): FLEXIBLE SPECIAL SUBFRAME DENSITY (X PER FRAME)

FIG. 9

| TDD DU/UL LATENCY | | TTI LENGTH (ms) | | | |
|---|---|---|---|---|---|
| | | 1 | 0.5 | 0.25 | 0.125 |
| FLEXIBLE SPECIAL SUBFRAME DENSITY (X PER FRAME) | CASE 1-1: 1/5 (FIXED) | 4.267 / 4.95 | 2.13 / 2.48 | 1.07 / 1.24 | 0.53 / 0.62 |
| | CASE 1-2: 1/5 (FLEXIBLE) | 4.267 | 2.13 | 1.07 | 0.53 |
| | | 4.267 TTIs | | | |
| | CASE 2-1: 1/3 (FIXED) | 3.98 / 4.9 | 1.99 / 2.45 | 1 / 1.23 | 0.5 / 0.61 |
| | CASE 2-2: 1/3 (FLEXIBLE) | 3.98 | 1.99 | 1 | 0.5 |
| | | 3.98 TTIs | | | |
| | CASE 3-1: 1/2 (FIXED) | 3.95 / 5.3 | 1.98 / 2.65 | 0.99 / 1.33 | 0.49 / 0.66 |
| | CASE 3-2: 1/2 (FLEXIBLE) | 3.95 | 1.98 | 0.99 | 0.49 |
| | | 3.95 TTIs | | | |
| | CASE 4: ALL (FLEXIBLE) | 3.6 | 1.8 | 0.9 | 0.45 |
| | | 3.6 TTIs | | | |

FIG. 10

| TDD DU/UL LATENCY | TTI LENGTH (ms) | | | |
|---|---|---|---|---|
| | 1 | 0.5 | 0.25 | 0.125 |
| CASE 4: ALL (FLEXIBLE) | 2.4 TTIs | | | |
| FLEXIBLE SPECIAL SUBFRAME DENSITY (X PER FRAME) | 2.4 | 1.2 | 0.6 | 0.3 |

FIG. 11

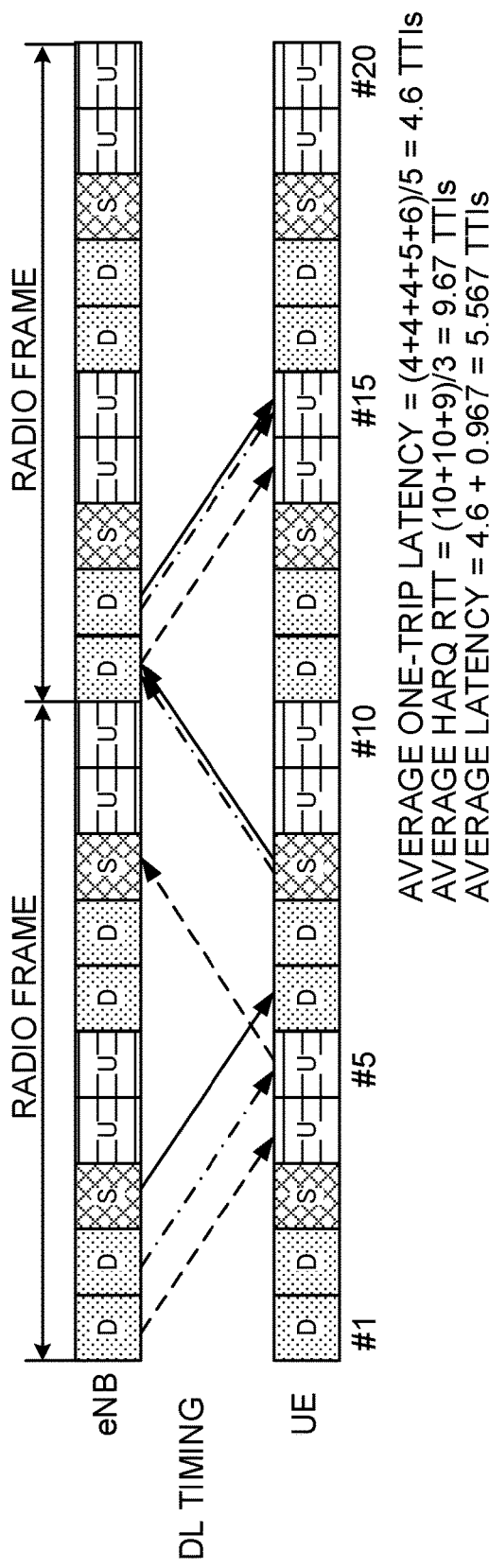
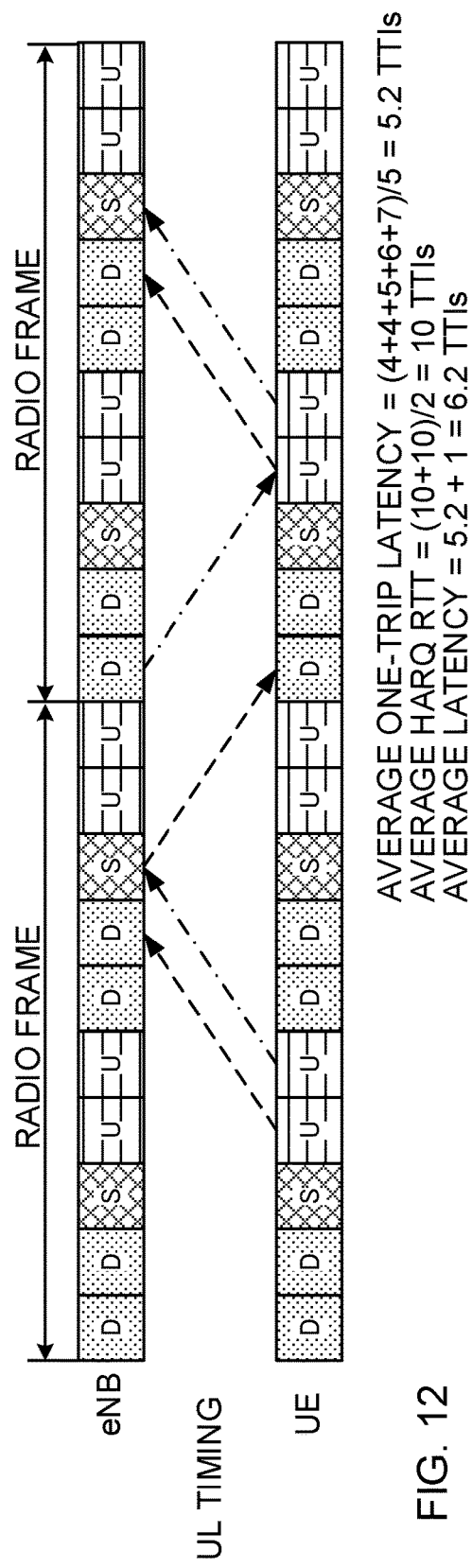
FIG. 12

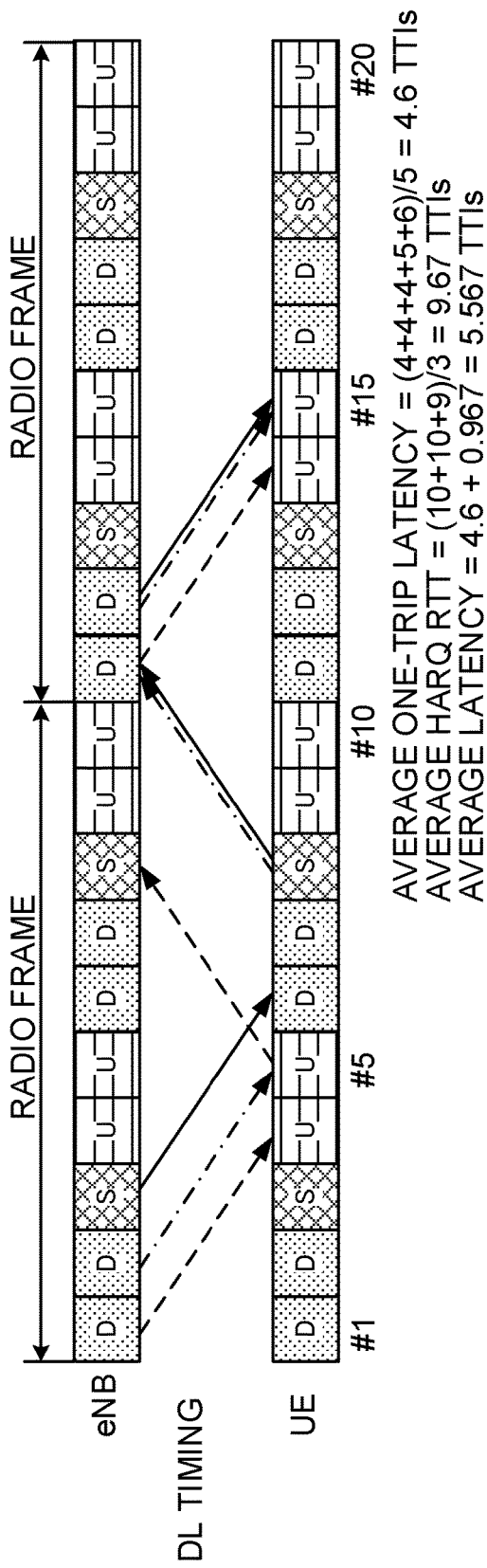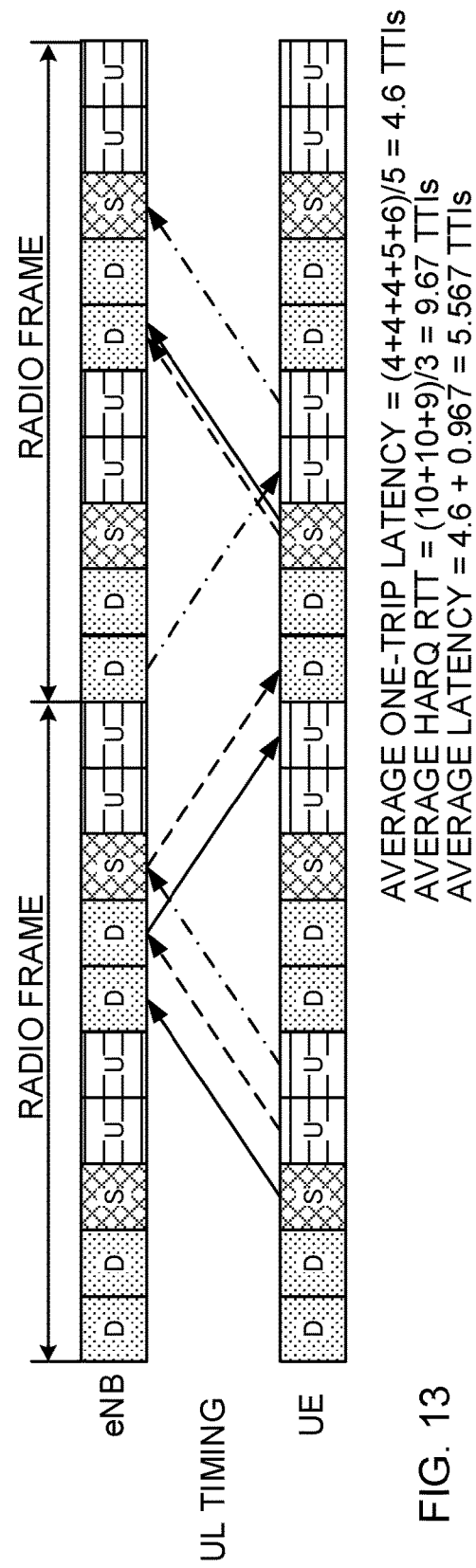
FIG. 13

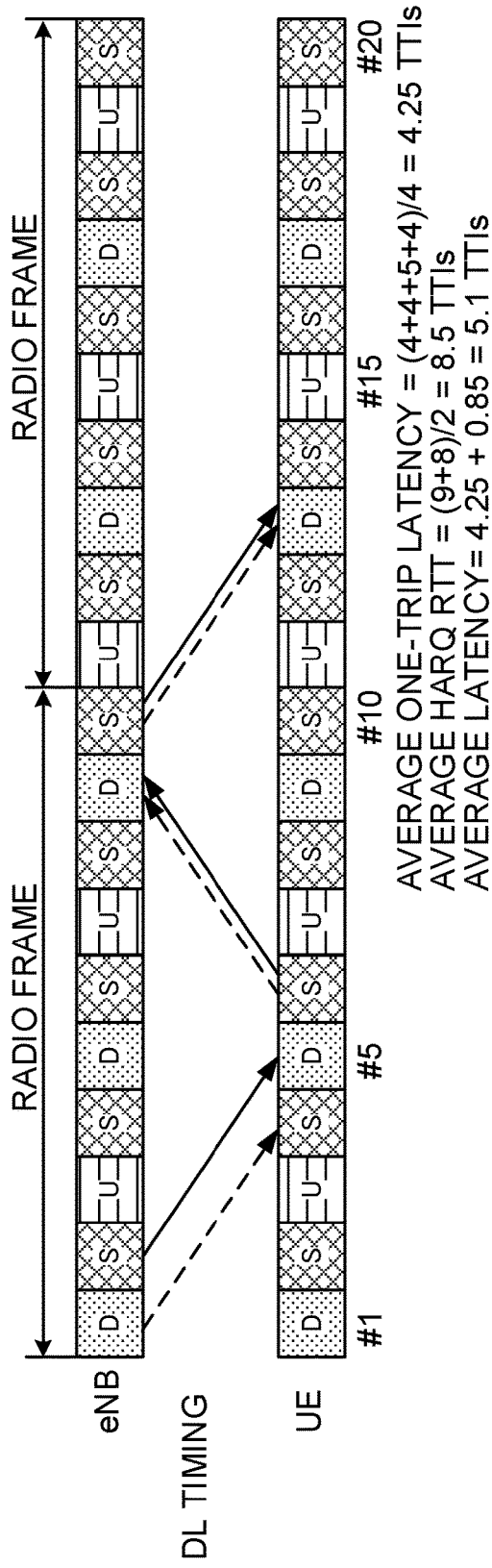
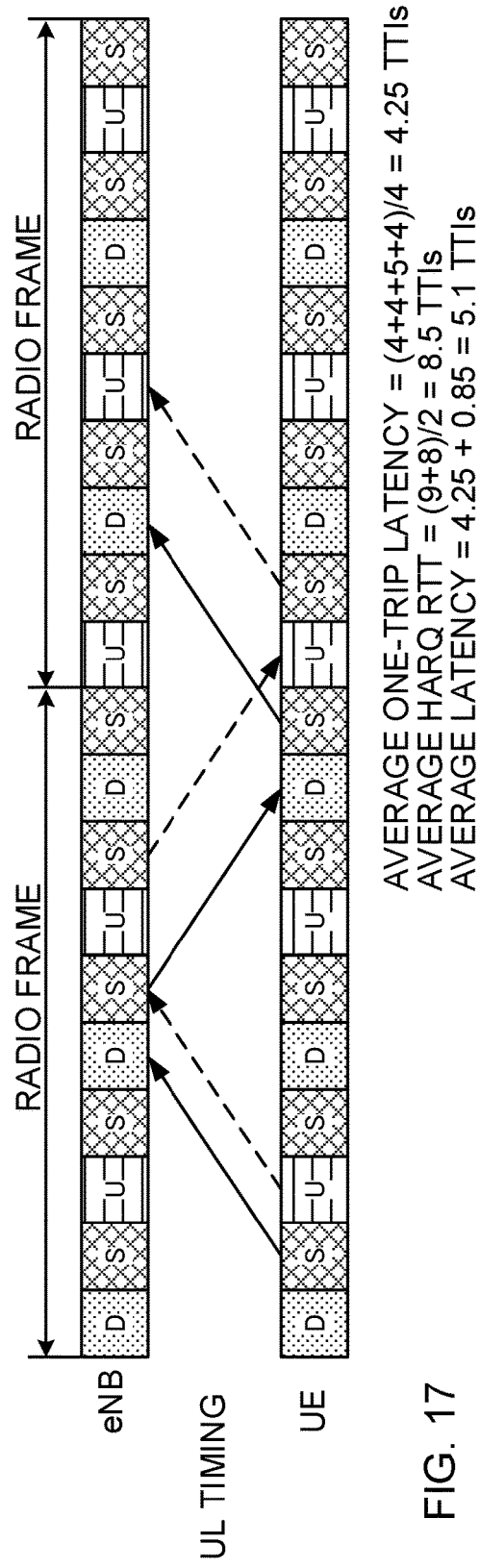
FIG. 17

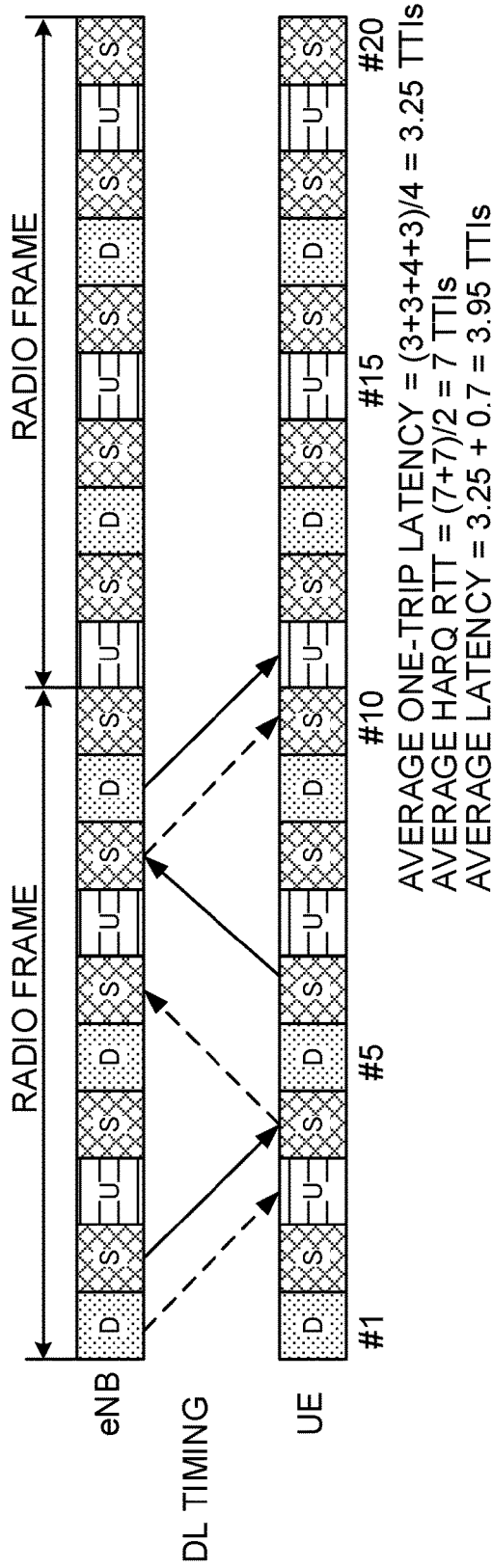
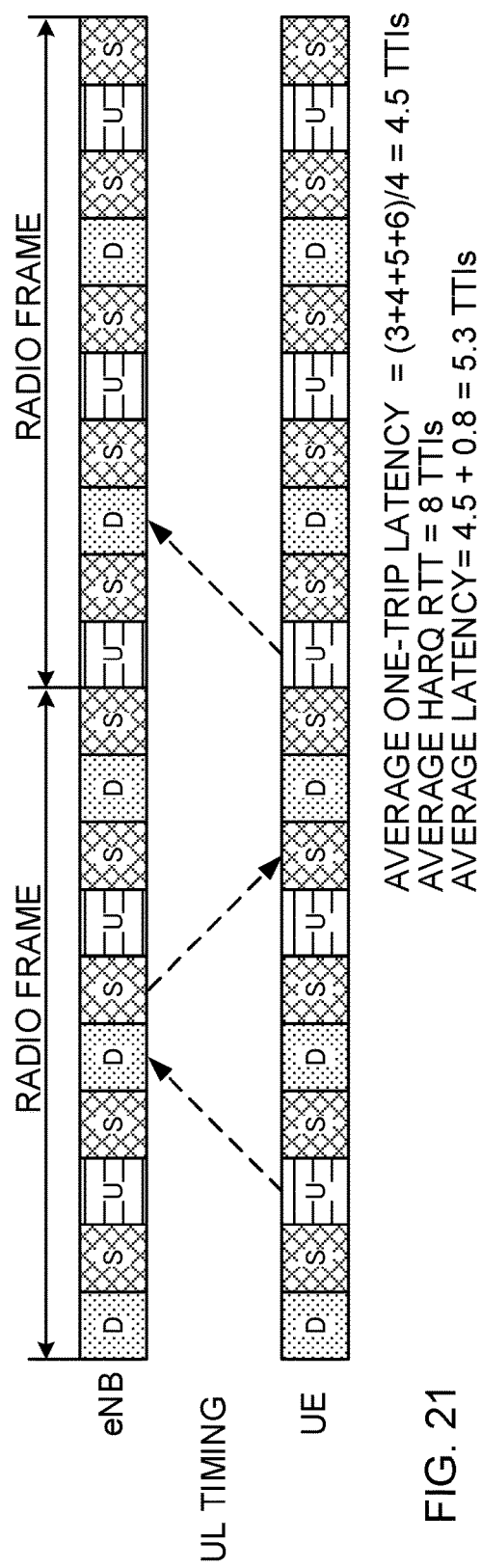
FIG. 21

TERMINAL AND RADIO COMMUNICATION METHOD

CROSS-REFERENCE TO RELATED APPLICATIONS

This application is a continuation application and, thereby, claims benefit under 35 U.S.C. § 120 to U.S. patent application Ser. No. 16/086,723, filed on Sep. 20, 2018, titled "USER TERMINAL, RADIO BASE STATION AND RADIO COMMUNICATION METHOD," which is a national stage application of PCT Application No. PCT/JP2017/011084, filed on Mar. 21, 2017, which claims priority to Japanese Patent Application No. 2016-059129, filed on Mar. 23, 2016. The contents of these applications are incorporated by reference in their entirety.

TECHNICAL FIELD

The present invention relates to a user terminal, a radio base station and a radio communication method in a next-generation mobile communication system.

BACKGROUND ART

In the UMTS (Universal Mobile Telecommunications System) network, the specifications of long term evolution (LTE) have been drafted for the purpose of further increasing high speed data rates, providing lower latency and so on (see non-patent literature 1). In addition, successor systems of LTE (referred to as, for example, "LTE-A (LTE-Advanced)," "FRA (Future Radio Access)," "5G (5th generation mobile communication system)" and so on) are also under study for the purpose of achieving further broadbandization and increased speed beyond LTE.

Also, in existing LTE systems (LTE Rel. 8 to 12), frequency division duplex (FDD), in which downlink (DL) transmission and uplink (UL) transmission are made in different frequency bands, and time division duplex (TDD), in which DL transmission and UL transmission are switched over time and made in the same frequency band, are introduced.

For example, in TDD, whether to use each subframe in the uplink (UL) or in the downlink (DL) is determined strictly based on UL/DL configurations. FIG. 1 is a diagram to show existing LTE UL/DL configurations. As shown in FIG. 1, in existing LTE, seven UL/DL configurations 0 to 6 are defined.

Furthermore, in existing systems, the transmission time intervals (TTIs), which are applied to DL transmission and UL transmission between radio base stations and user terminals, are configured to one ms and controlled. Transmission time intervals are also referred to as "communication time intervals," and a TTI in LTE systems (Rel. 8 to 12) is also referred to as a "subframe duration."

CITATION LIST

Non-Patent Literature

Non-Patent Literature 1: 3GPP TS 36.300 "Evolved Universal Terrestrial Radio Access (E-UTRA) and Evolved Universal Terrestrial Radio Access Network (E-UTRAN); Overall Description; Stage 2"

SUMMARY OF INVENTION

Technical Problem

In the radio communication system (for example, 5G) of LTE Rel. 13 or later versions, the demand for communication in high frequency bands such as several tens of GHz, D2D (Device To Device) communication and/or V2V (Vehicular To Vehicular) communication, which require low-latency communication, and so on, is also increasing. In order to provide sufficient communication services in such future radio communication systems, it is necessary to reduce the latency in communication (latency reduction).

However, in existing LTE systems, when a cell (also referred to as a "CC," a "TDD carrier," etc.) uses TDD, the transmission timing is controlled in one-ms units based on the UL/DL configuration in which UL subframes and DL subframes are specified. Also, with existing UL/DL configurations, the number of times UL communication can be switched to DL communication within a radio frame (ten subframes) is limited to two at a maximum. In this case, the timing to send feedback such as A/N in response to DL transmission also depends on the UL/DL configuration, and there is a possibility that it will be difficult to achieve latency reduction that is required in future radio communication systems.

The present invention has been made in view of the above, and it is therefore an object of the present invention to provide a user terminal, a radio base station and a radio communication method that can adequately achieve the effect of latency reduction even when TDD is applied.

Solution to Problem

A user terminal according to one aspect of the present invention communicates using a radio frame including a flexible subframe whose subframe type is changeable, and has a control section that controls transmission/reception based on a first subframe type, in which a UL control channel, a DL control channel, a UL data channel and/or a DL data channel are included in one subframe, and a second subframe type, in which UL communication or DL communication is performed in one subframe, and a receiving section that receives information about a subframe type provided in each flexible subframe.

Advantageous Effects of Invention

According to the present invention, the effect of latency reduction can be adequately achieved even when TDD is applied.

BRIEF DESCRIPTION OF DRAWINGS

FIG. 1 is a diagram to show DL/UL configurations employed in existing TDD;

FIGS. 2A and 2B are diagrams to show examples of subframe formats for flexible special subframes;

FIGS. 6A to 6D are diagrams to show examples of cases where a data channel format is changed dynamically;

FIGS. 8A to 8D are diagrams to show examples of methods of investigating DL/UL latency in TDD;

FIG. 9 is a diagram to show results of studying DL/UL latency in TDD;

FIG. 10 is a diagram to show results of studying DL/UL latency in TDD;

FIG. 11 is a diagram to show results of studying DL/UL latency in TDD;

FIG. 12 is a diagram to show results of studying DL/UL latency in TDD;

FIG. 13 is a diagram to show results of studying DL/UL latency in TDD;

FIG. 17 is a diagram to show results of studying DL/UL latency in TDD;

FIG. 21 is a diagram to show results of studying DL/UL latency in TDD;

DESCRIPTION OF EMBODIMENTS

Figure 3A:
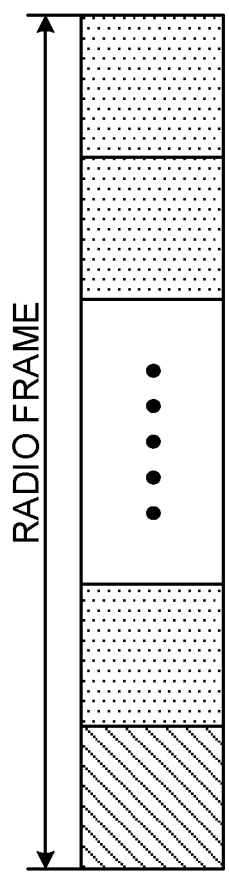
FIGS. 3A to 3D are diagrams to show examples of subframe types that are configured for flexible subframes.

For future radio communication systems (for example, 5G), studies are in progress to communicate using high frequency bands (for example, in bands of several tens of GHz), where it is easy to secure a wide band. Application of TDD to communication using high frequency bands is under study.

As described above, in TDD in existing LTE systems, the transmission timing is controlled in units of one ms based on the UL/DL configuration (see FIG. 1), in which the UL subframe and the DL subframe are specified. Since the timing of UL transmission (UL subframes) is restricted in TDD, the latency in TDD depends on the UL/DL configuration. Also, there is a problem that the latency in TDD is greater than in FDD where DL and UL are configured in different frequencies.

Also, in most UL/DL configurations (UL/DL configurations 1-6) stipulated in TDD, the UL latency is greater than the DL latency because the proportion of UL subframes is smaller than the proportion of DL subframes. Furthermore, in UL/DL configuration, the number of points that can switch between UL and DL in one frame (ten subframes) is limited to two at a maximum. Therefore, the timing of the transmission of the feedback signal (for example, HARQ-ACK, etc.) in response to the DL transmission is also limited as compared with the FDD.

Reduction in communication latency (latency reduction) is required in order to provide sufficient communication services in future radio communication systems. For example, in a future radio communication system, it is desirable to set the latency of a predetermined signal (for example, U-plane) to a predetermined value (for example, one ms). However, with TDD for existing systems, it is difficult to fulfill the conditions concerning latency required in future radio communication systems.

It may be possible to introduce a new TDD frame format to reduce the latency in TDD. For example, it may be possible to increase the number of special subframes within one radio frame and increase the number of times DL and UL are switched. Alternatively, it may be possible to introduce a special subframe in a new subframe format.

For example, it may be possible to provide a special subframe in a format in which a DL control channel and a UL control channel are included in the same subframe, and in which, furthermore, a DL data channel and/or a UL data channel are also included in the same subframe (see FIGS. 2A and 2B). FIG. 2A shows the case of arranging a data channel between a DL control channel and a UL control channel. FIG. 2B shows a case in which a DL control channel, a UL control channel, and a DL data channel are arranged in order. Also, it is possible to use a format in which a gap period (GP) is provided between DL communication and UL communication.

A format in which the communication direction (DL or UL) of the data channel arranged in the special subframe is dynamically configured by the DL control channel within the same subframe may be used. Alternatively, the communication direction of data channel may be configured by a DL control channel from one or more subframes before, not the DL control channel in the same subframe. A special subframe in which the data channel can be changed in this way is also referred to as a "flexible special subframe."

Also, in order to fulfill the requirement that latency be equal to or less than a predetermined value (for example, one ms), subframes having a shorter time duration (TTI duration) than subframes for existing LTE systems (LTE Rel. 8 to 12) may be employed. Such TTIs (subframes) in which the transmission time interval (TTI) is shorter than one ms in existing systems is also referred to as "shortened TTI (short TTI)," "short subframe" and so on.

For example, it may be possible to make the TTI duration smaller (for example, 0.25 ms, 0.125 ms, etc.) than 0.5 ms in order to achieve a latency less than one ms. When setting the TTI duration to 0.125 ms, while it is possible to achieve a latency less than one ms, in order to enable transmission/reception of data of various transport block (TB) sizes in one TTI, it is preferable to shorten the TTI duration by shortening the symbol duration. In this case, symbol duration becomes very short and subcarrier spacing becomes long.

Meanwhile, when setting the TTI duration to 0.25 ms, depending on the method of configuring the special subframe (for example, flexible special subframe), it is possible to achieve a latency smaller than one ms. For example, the present inventors have found out that latency can be reduced by increasing the number of special subframes configured in a radio frame, and configuring special subframes in a flexible special subframe format and so on (see the third embodiment below).

Also, when introducing special subframes (for example, flexible special subframes), it may be possible to configure all subframes in a radio frames as being flexible special subframes (format 1). Alternatively, it may be possible to configure some subframes as being flexible subframes, and configure the other subframes as being DL subframes or UL subframes (format 2).

In future communication systems, support for various communication, such as a mode (for example, SDL (Supplemental Downlink) TDD) in which only DL transmission is performed, a mode in which only UL transmission is performed, and a CA mode in which different frame formats are applied for each CC, may be required. In this way, there are cases where it is preferable to use subframes for dedicated use for DL communication and subframes for dedicated use for UL communication. Therefore, it may be possible to design communication using TDD primarily based on format 2, and use format 1 as a special case of format 2.

Therefore, as one aspect of the present embodiment, the present inventors have come up with the idea of configuring and dynamically changing a plurality of subframe types, including at least a special subframe (for example, flexible special subframe) for the multiple subframes included in a radio frame.

As an example of a format including a plurality of subframe types, a format including a first subframe type, in which a UL control channel, a DL control channel, a UL data channel and/or a DL data channel are included in one subframe, and a second subframe type, in which UL communication or DL communication is performed in one subframe, can be used. The first subframe type corresponds to flexible special subframes, and the second subframe type corresponds to normal subframes. Also, the second subframe type (normal subframe) may be separately configured for UL subframes for UL communication and DL subframes for DL communication.

Note that the subframe format for the flexible special subframe does not necessarily include the UL communication (for example, UL control channel) as long as it is a format that can be used for switching the DL communication to the UL communication (having a period referred to as "gap," "guard period," or "guard interval"). For example, a flexible special subframe may be formed by DL communication (for example, DL control channel and DL data channel) and a gap period. Alternatively, the flexible special subframe may be formed using the DL control channel, the gap period and the UL data channel. Alternatively, a format that does not configure (for example, DL control channel, gap period and UL control channel) the data channel may be used as the subframe format for the flexible special subframe.

Also, as another aspect of the present embodiment, the present inventors have come up with the idea of dynamically changing and configuring data transmission (for example, the communication direction of data channels) in some or all of multiple subframes included in a radio frame.

Now, embodiments of the present invention will be described below in detail with reference to the accompanying drawings. Note that the radio communication methods of the above-described embodiments may be applied individually or may be applied in combination.

First Embodiment

In a first embodiment of the present invention, the case of changing the subframe type that is configured for multiple subframes included in a radio frame is described. Note that the radio frame is configured to have a length of a predetermined period. For example, one radio frame may be formed with a predetermined number of subframes (for example, ten subframes), or one radio frame may be formed in a predetermined period (for example, one ms).

<Changing Subframe Type in Each Subframe>

Each subframe (dynamic subframe, flexible subframe) included in the radio frame can be in a format in which the subframe type can be variably configured. This format is equivalent to the case where all subframes included in a radio frame are flexible subframes.

For example, a special subframe (first subframe type) or a normal subframe (second subframe type) is dynamically changed and configured for each subframe. When normal subframes are UL subframes or DL subframes, a special subframe, a UL subframe, or a DL subframe is dynamically changed and configured for each subframe.

<Configuration of Anchor Subframe>

Alternatively, it may possible to fixedly configure a subframe type for some subframes included in a radio frame, and to dynamically change and configure multiple subframe types for the remaining subframes. Such a format is used when a part of the subframes included in a radio frame is an anchor subframe and another subframe is a flexible subframe.

An anchor subframe is a subframe in which a subframe type and a position of a subframe provided within a radio frame are fixedly or semi-statically fixedly configured. The position where an anchor subframe is provided may be, for example, at least the first subframe in a radio frame.

<Determination of Subframe Type>

The subframe format for each subframe can be selected from predefined subframe sets (subframe type). For example, as a predefined subframe set, a special subframe (first subframe type) having at least a UL control channel and a DL control channel, and a normal subframe (second subframe type) are defined. Then, either subframe type is configured for each subframe.

FIGS. 3A, 3B, 3C, and 3D show a case where a special subframe and a normal subframe are defined as a subframe set, and one of the subframe types is dynamically assigned to each subframe. In FIGS. 3A, 3B, 3C, and 3D assume a case where an anchor subframe is configured at the head of a radio frame. In the anchor subframe, a normal subframe, a special subframe or a predetermined subframe format is fixedly configured.

Figure 3B:
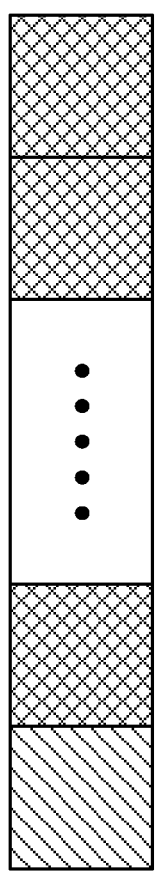
Figure 3C:
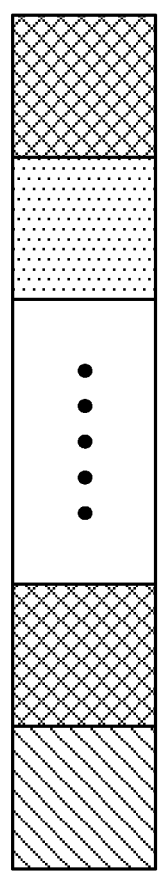
Figure 3D:
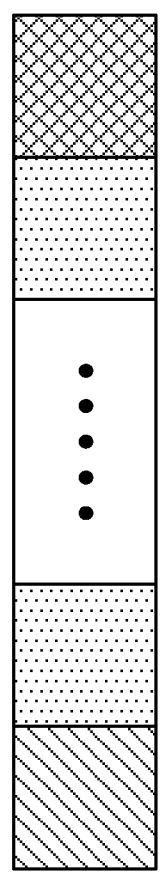

FIG. 3A shows a case of configuring a flexible subframe (excluding anchor subframe) constituting a radio frame as a normal subframe. FIG. 3B shows a case of configuring a flexible subframe constituting a radio frame as a special subframe. FIGS. 3C and 3D show a case where part of the flexible subframes constituting a radio frame are configured as special subframes, and the other flexible subframes are configured as normal subframes.

By using a format in which a predetermined subframe type is selected from among a plurality of subframe types including at least a special subframe and the selected subframe type is configured for a plurality of subframes included in the radio frame, it is possible to adequately achieve the effect of latency reduction even when TDD is applied.

Alternatively, a format to change the subframe format of each subframe may be applied, without defining a subframe set. For example, each subframe can be comprised of DL communication, a gap period and UL communication, and at least the length and position of the gap period are changed to configure a subframe format.

<Method of Reporting Subframe Format>

The radio base station reports information about subframe formats (for example, subframe type to be configured) to the user terminal. The user terminal controls the signal and/or channel transmission processes, receiving processes and so on based on information about subframe formats reported from the radio base station.

The radio base station can semi-statically report the information about subframe formats to the user terminal via higher layer signaling (for example, RRC signaling, broadcast information, etc.). Alternatively, the radio base station can dynamically report information about subframes to the user terminal via physical layer signaling (for example, in a DL control channel). An example of information about subframe formats that can be transmitted in higher layer signaling and/or downlink control information will be described below.

As one method of reporting information about subframe formats, a reporting method based on the bitmap format can be adopted.

Figure 4A:
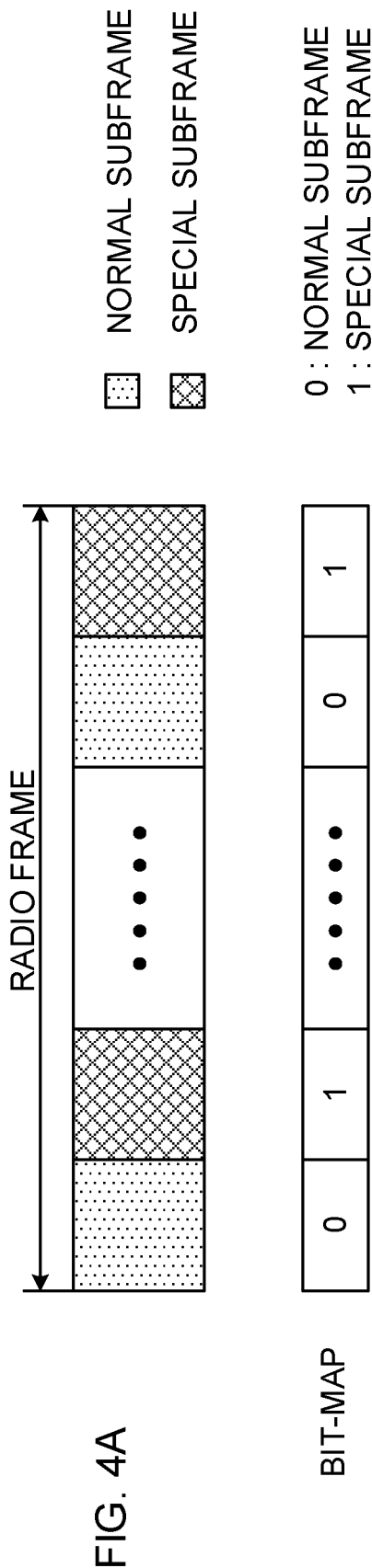
FIGS. 4A and 4B are diagrams to show examples of methods of reporting information about subframe types.

When a reporting method based on the bitmap format is used, the radio base station reports a bitmap indicating the subframe type of each flexible subframe to the user terminal (see FIG. 4A). In the case shown in FIG. 4A, "0" represents a normal subframe and "1" represents a special subframe. When reporting the subframe type using the bitmap, the subframe type may also be reported for flexible subframes other than the anchor subframe or reported for all subframes including the anchor subframe. In addition, the radio base station can report the subframe type using the bitmap for the subframe type provided within the subframe of the predetermined range (for example, the range of the radio frame).

Alternatively, another way to report information about subframe formats may be to report information about the location of subframes for which a predetermined subframe type (for example, special subframe) is configured.

For example, a predetermined rule is determined for the subframe format in advance, and a subframe format to be configured to each subframe is determined on the user terminal side according to parameters reported from the radio base station. As an example, the subframe type of each subframe can be determined by modulo operation using the subframe index and the parameters reported from the radio base station. An example of modulo operation is shown below. The method of modulo computation is not limited to this.

When t mod (N)=0, it is assumed that the corresponding subframe is a special subframe. Here, t is a subframe index, and N is a parameter that is configured from the radio base station.

Alternatively, the radio base station may report information about the length of the gap period (GP length) and the starting position (GP starting position) in one subframe to the user terminal. For example, if the gap period in one subframe is one symbol long and starts from the position of the eighth symbol, the radio base station reports the combination (1, 8) of these two symbols to the user terminal.

Figure 4B:
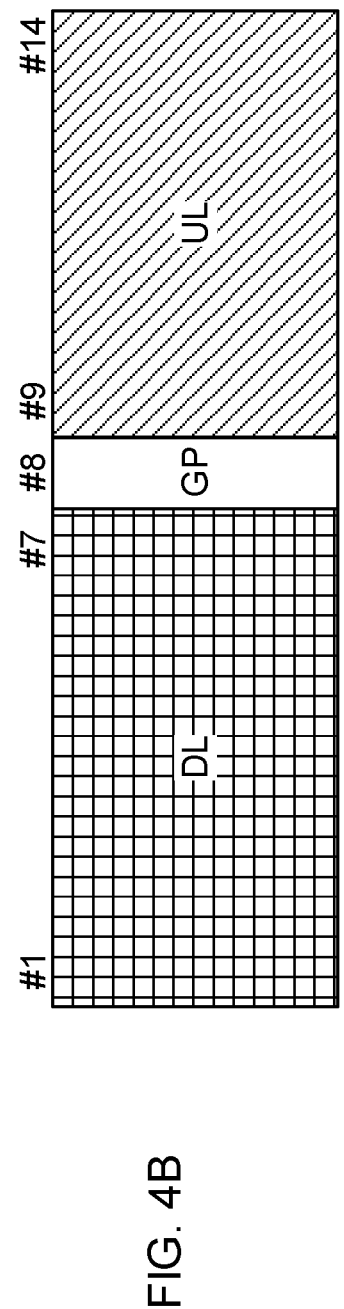

The user terminal can determine the subframe format based on the information reported from the radio base station. For example, if one subframe is formed with fourteen symbols, upon receiving (1, 8), the user terminal controls transmission/reception process, assuming that the first to seventh symbols are for DL communication, the eighth symbol is a gap period, and the eighth symbol to the fourteenth symbol are for UL communication (see FIG. 4B).

Also, when information about the length (GP length) and the starting position (GP starting position) of the gap period in one subframe is reported to the user terminal, the information may be reported for all subframes or reported only for predetermined subframes. For example, in the case where the subframe type for each subframe is not selected from the predefined subframe types, or in the case where all the subframes are special subframes, the gap period-related information about all the subframes is reported to the user terminal. Meanwhile, in the case where a subframe index on which a special subframe is configured is determined in advance and the subframe format of this special subframe can be changed dynamically, the gap period-related information about the subframe in which the special subframe is configured may be reported to the user terminal.

When the radio base station reports information about a subframe format to the user terminal using physical layer signaling (for example, DL control channel), the radio base station can be configured to signal the information in units of radio frames. Alternatively, the radio base station may signal information about subframe formats to the user terminal in subframe units.

When reporting information about subframe formats to the user terminal in units of radio frames, physical layer signaling can be used in a predetermined subframe (for example, the first subframe) included in the radio frame. In this case, the predetermined subframe is a DL subframe or a special subframe other than the normal subframe (UL subframe) for UL communication. Also, as shown in FIG. 3, when an anchor subframe is provided in a radio frame, the information about subframe formats may be reported to the user terminal using the anchor subframe serving as a DL subframe or a special subframe.

When information about subframe formats is reported to the user terminal in units of subframes, the subframe format can be reported to the user terminal using the DL control channel (for example, downlink control information) in each subframe. Also, subframes (for example, a normal subframe for UL communication) for which the DL control channel is not arranged may not include information about subframe formats. In such a case, the user terminal can control the communication on the assumption that the subframe not including information about subframe formats is a normal subframe for UL communication.

Figure 5:
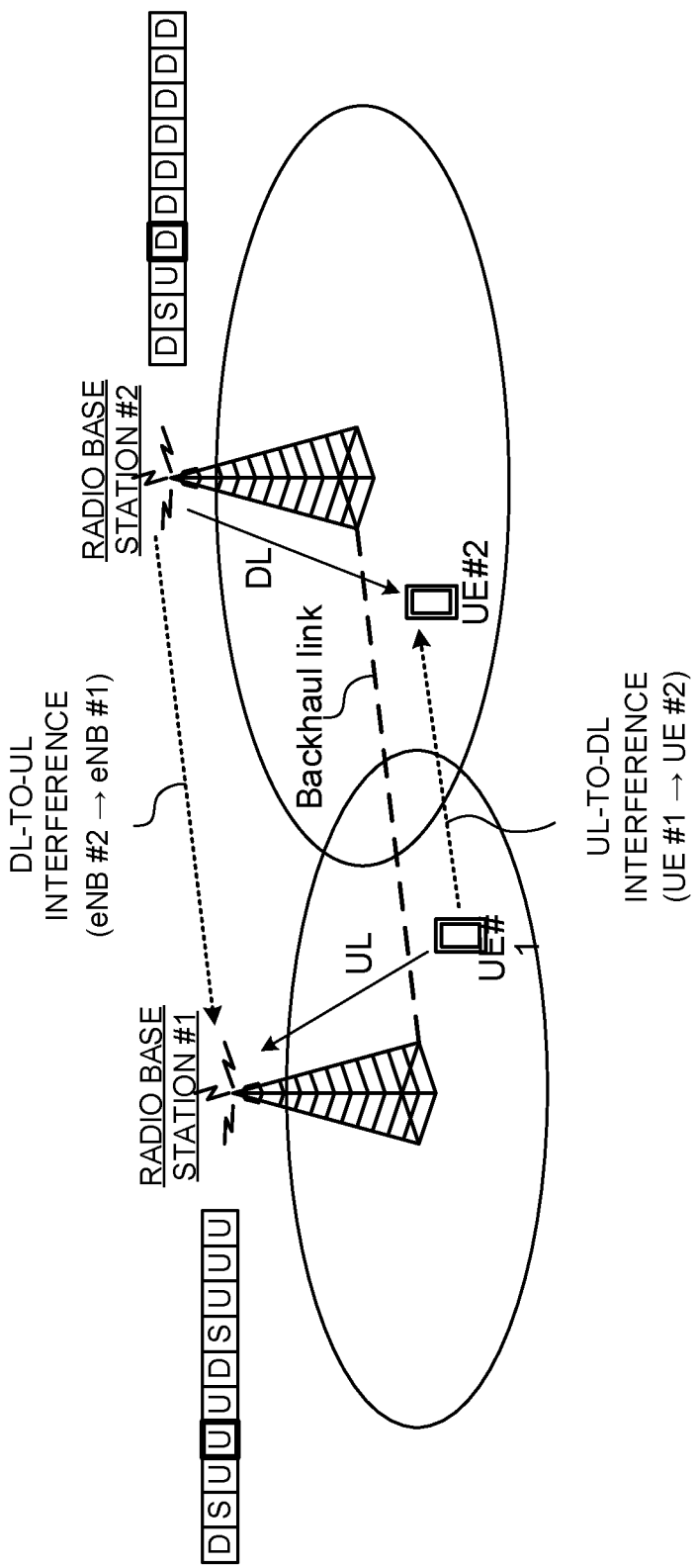
FIG. 5 is a diagram to explain UL-DL interference.

Also, when the radio base station determines the subframe format, the radio base station may determine the subframe format based on information reported from other radio base stations (for example, adjacent radio base stations). For example, if the radio base station selects a given UL/DL configuration as a subframe format and reports this to the user terminal using the bitmap format, the radio base station may report the predetermined UL/DL configuration to the other radio base stations through the backhaul link (X2 signaling, S1 signaling, etc.) (see FIG. 5). FIG. 5 shows a case where interference occurs between radio base stations, and, to suppress such interference, the UL/DL configuration is preferably reported between adjacent base stations to determine the subframe format.

In this case, the radio base station may request a different radio base station to use the predetermined UL/DL configuration, and the different radio base station may determine the subframe format (for example, same subframe format) taking into consideration the reported predetermined UL/DL configuration. At this time, the radio base station adopting the subframe format taking into account the reported predetermined UL/DL configuration may send signaling (ACK) to the requesting radio base station to comply with the request.

Second Embodiment

In a second embodiment, the case of dynamically changing data transmission (for example, data channel communication direction, UL/DL configuration, etc.) in some or all subframes included in a radio frame is described. Note that the second embodiment may be used alone or in combination with the first embodiment.

It is possible to use a format in which the data channel in each subframe can be changed according to the subframe type. Hereinafter, a data channel configuration method according to present embodiment is shown. In the following example, a case where a normal subframe and a special subframe are adopted as a subframe type is shown, but the present embodiment is not limited thereto.

<Aspect 1>

A format in which the communication direction of the data channel (data transmission) in each subframe can be changed to either DL or UL can be used (see FIG. 6A). In the case shown in FIG. 6A, a format in which the communication direction of the data channel can be changed in both the normal subframe and the special subframe is used. As a result, it is possible to flexibly configure the UL data and the DL data in each subframe according to the communicating environment. As a result, latency can be reduced even when TDD is applied.

<Aspect 2>

By using a format in which the communication direction of the data channel (data transmission) in the special subframe can be changed to either DL or UL, the data channel in the normal subframe can be oriented in the preconfigured communication direction (see FIG. 6B). In the case shown in FIG. 6B, a format in which the communication direction of a data channel in a special subframe can be changed is used, and a normal subframe is oriented in a predetermined communication direction (here, DL transmission). In this case, since it is sufficient to report information about the communication direction of the data channel only for the special subframe to the user terminal, an increase in the overhead can be suppressed.

<Aspect 3>

By using a format that can change the communication direction of the data channel (data transmission) in the special subframe to DL or UL, or a combination of DL and UL, it is possible to change the data channel in the normal subframe to the preconfigured communication direction (see FIG. 6C). In the case shown in FIG. 6C, a format in which the communication direction of the data channel in the special subframe can be changed is used, and the normal subframe is oriented in a predetermined communication direction (here, DL transmission). Further, in the special subframe, the UL data channel and the DL data channel can be simultaneously configured within one subframe. As a result, transmission opportunities for UL data transmission and DL data transmission can be reserved, so that latency can be reduced.

<Aspect 4>

By using a format in which the communication direction of the data channel (data transmission) in the normal subframe can be changed to either DL or UL, it is possible to direct the data channel in the special subframe to the preconfigured communication direction (see FIG. 6D). In this case, information about the communication direction of the data channel can be reported to the user terminal only for the normal subframe and thereby an increase in overhead can be suppressed. Further, since the communication direction of the data channel in the normal subframe can be flexibly configured, the latency can be reduced.

<Data Channel Format Reporting Method>

The radio base station reports information about the data channel format (for example, UL/DL configuration) to the user terminal. The user terminal controls the transmission and reception processes of the data channel based on the data channel format-related information reported from the radio base station.

The radio base station can dynamically report information about the data channel to the user terminal via physical layer signaling (for example, DL control channel). Alternatively, the radio base station may semi-statically report information about the data channel to the user terminal via higher layer signaling (for example, RRC signaling, broadcast information, etc.).

As one method for reporting information about data channels, a reporting method based on a bitmap format can be adopted.

Figure 7:
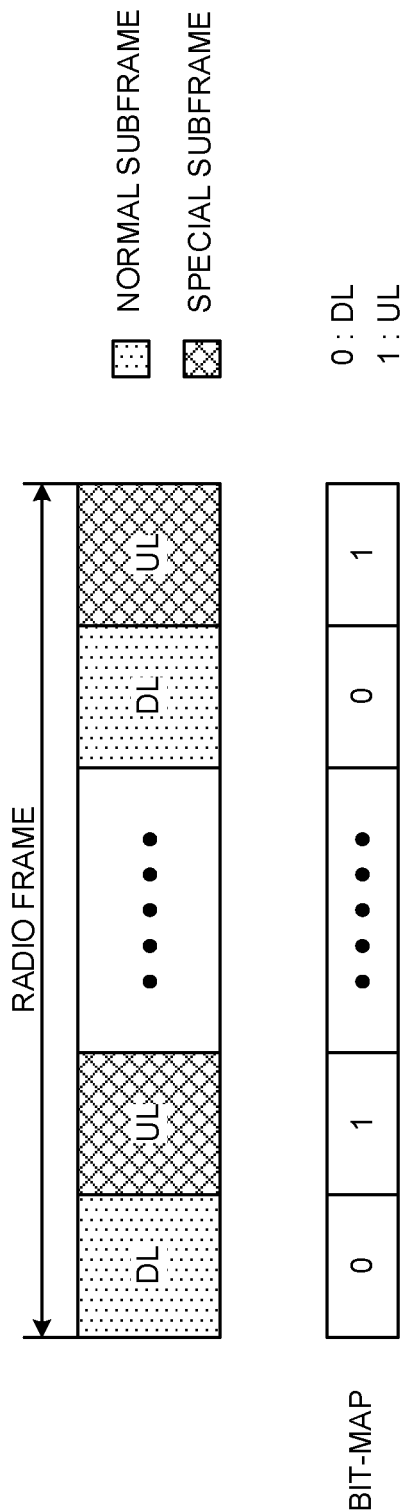
FIG. 7 is a diagram to show an example of a method of reporting information related to data channel formats.
Figure 14:
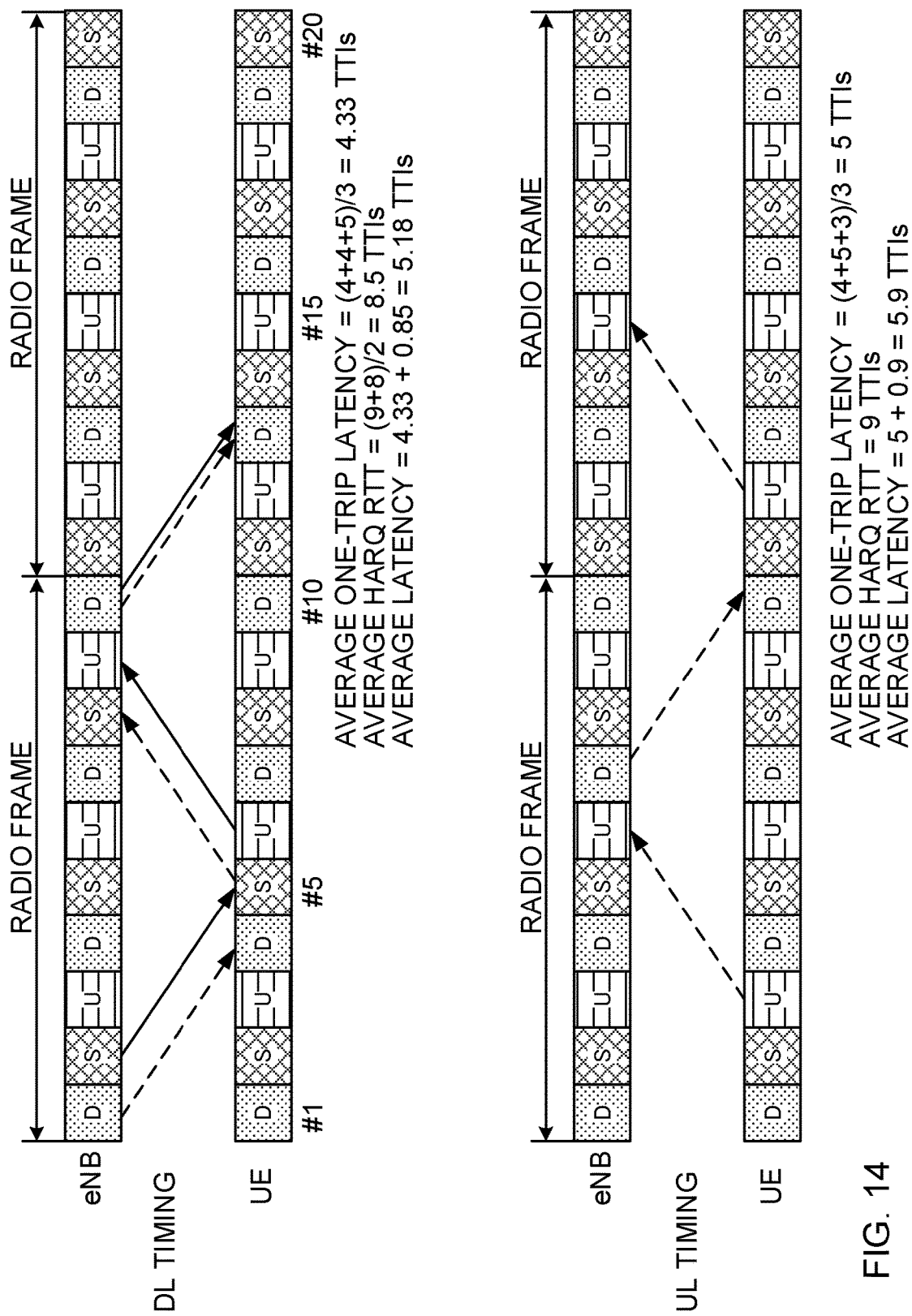
FIG. 14 is a diagram to show results of studying DL/UL latency in TDD.
Figure 15:
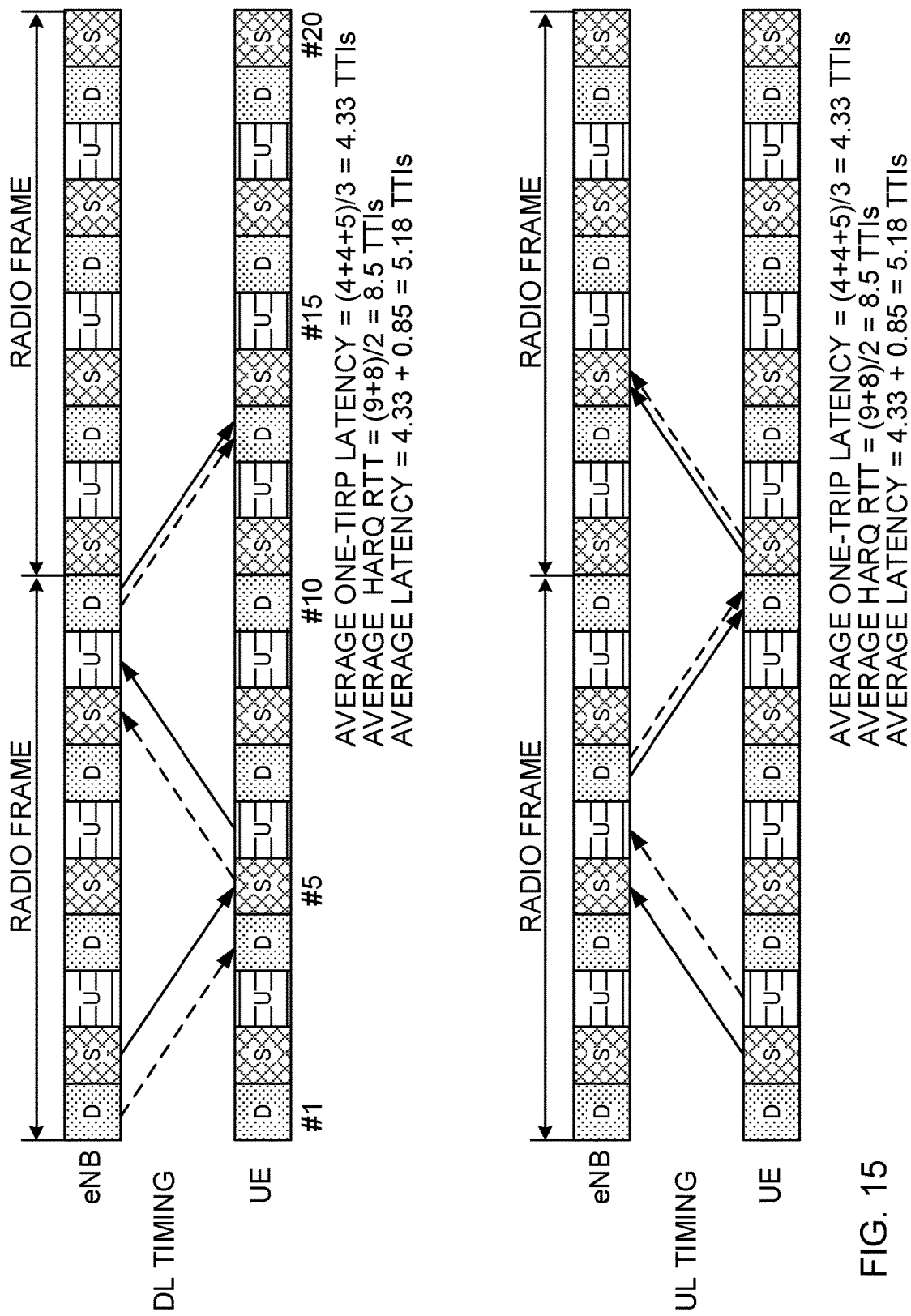
FIG. 15 is a diagram to show results of studying DL/UL latency in TDD.
Figure 16:
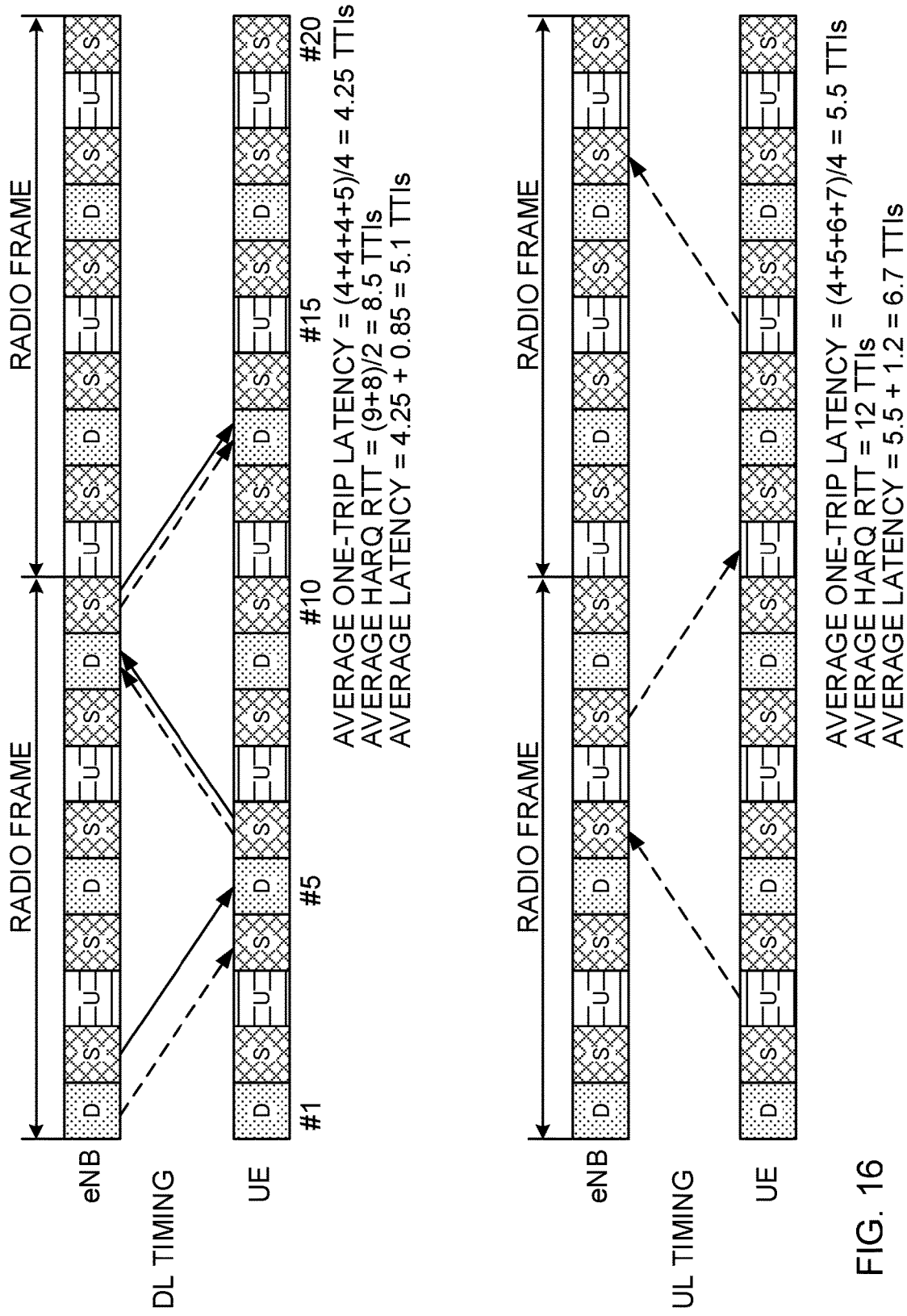
FIG. 16 is a diagram to show results of studying DL/UL latency in TDD.
Figure 18:
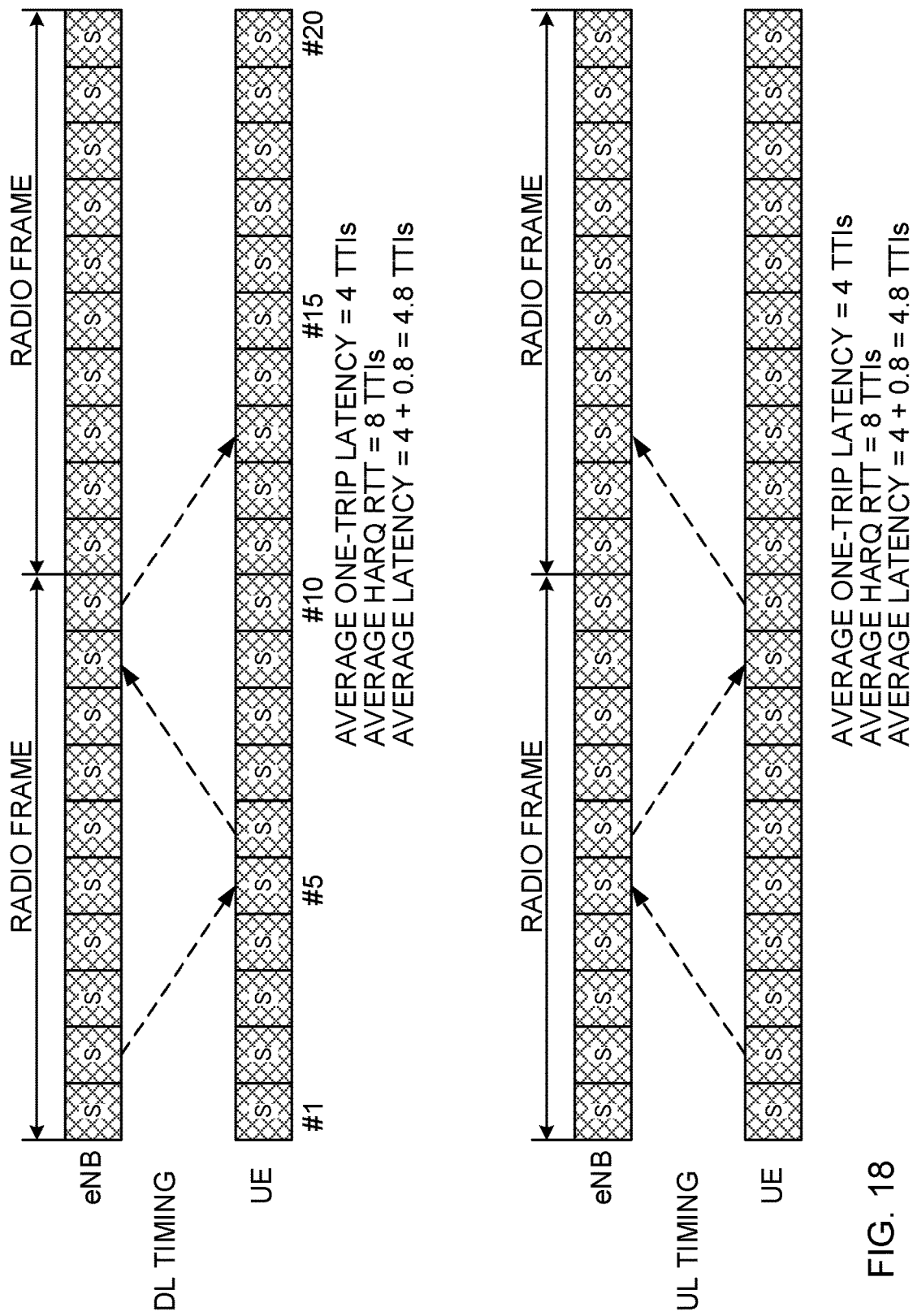
FIG. 18 is a diagram to show results of studying DL/UL latency in TDD.

When using a reporting method based on the bitmap format, the radio base station reports a bitmap indicating a data channel format in a subframe in which a data channel can be changed to the user terminal (see FIG. 7). In the case shown in FIG. 7, "0" represents the DL data channel and "1" represents the UL data channel. In addition, reporting on a predetermined range (for example, radio frame range) can be performed using a bitmap.

Also, when the radio base station reports information about the data channel format to the user terminal in units of radio frames, physical layer signaling in a predetermined subframe (for example, the first subframe) included in the radio frame can be used. In this case, the predetermined subframe is a DL subframe or a special subframe other than the normal subframe (UL subframe) for UL communication. Also, as shown in FIG. 3, when an anchor subframe is provided within a radio frame, information about the data channel format may be reported to the user terminal using the anchor subframe serving as a DL subframe or a special subframe.

Note that FIG. 7 shows a case where either a DL data channel or a UL data channel is specified using a bitmap, but this is not limiting. As shown in FIG. 6C, when providing both the UL data channel and the DL data channel, the above information can be reported by increasing the number of bits in the bitmap.

Also, when the subframe format for the special subframe can be changed dynamically, information about the gap period related to the subframe in which the special subframe is configured may be may be reported to the user terminal. In this case, the radio base station can report information about the length and the starting position of the gap period in one subframe to the user terminal. For example, if the gap period in one subframe is one symbol long and starts from the position of the eighth symbol, the radio base station reports the combination (1, 8) of these two symbols to the user terminal. In the case of sending the above report in units of radio frames, the report can be sent using a bit map for each special subframe included in the radio frame.

When information about the data channel format is reported in units of subframes, the data channel format can be reported to the user terminal using the DL control channel (for example, downlink control information) in each subframe. Also, information about the data channel format may not be included in subframes (for example, a normal subframe for UL communication) where the DL control channel is not arranged. In such a case, the user terminal can control the communication on the assumption that the subframe not including the information about the data channel format is a normal subframe for UL communication.

When the subframe format for the special subframe can be changed dynamically, information about the gap period in the subframe in which the special subframe is configured is included in the downlink control information for each special subframe and reported to the user terminal.

UL data and DL data can be flexibly configured by dynamically changing data transmission (for example, data channel communication direction, UL/DL configuration, etc.) in some or all subframes included in a radio frame. As a result, even when TDD is used, latency reduction is possible.

Note that the information about the data channel format and the information about subframe formats described in the first embodiment may be separately reported to the user terminal or reported at the same time. When reporting these pieces of information separately, it is possible to report information about subframe formats with higher layer signaling and information about the data channel format with lower layer signaling. When reporting these pieces of information at the same time, the information may be reported to the user terminal via higher layer signaling and/or physical layer signaling by combining the information about the data channel format and the information about subframe formats.

Third Embodiment

In a third embodiment, the latency due to the method for allocating special subframes in TDD is described. Specifically, the latency due to the number of special subframes configured in the radio frame is described.

First of all, there are four cases (case 1 to 4) regarding the number of special subframes that are configured in a radio frame (see FIGS. 8A, 8B, 8C, and 8D). According to the format assumed here, the radio frame is formed of ten subframes (ten TTIs), and the special subframe is arranged in a distributed manner within the radio frame. A special subframe is configured once every five subframes in case 1 (see FIG. 8A), a special subframe is configured once every three subframes in case 2 (see FIG. 8B), a special subframe is configured once every two subframes in case 3 (see FIG. 8C), and a special subframe is configured in all subframes in case 4 (see FIG. 8D).

Furthermore, in association with each of cases 1 to 4, the latency when the special subframe is used for DL data transmission (fixed special subframe) and the latency when the special subframe is used for DL or UL data transmission (flexible special subframe) are studied respectively. Note that the fixed special subframe corresponds to a special subframe format (which can be used to transmit/receive DL data, but cannot be used to transmit/receive UL data) for existing systems.

Also, in the present embodiment, latency is under study assuming that the processing latency is three TTIs, two TTIs or one TTI. Processing latency is the time required for processing operation, for example, the minimum latency necessary for feeding back the A/N in response to the DL signal. As an example, in the FDD of the existing system, in consideration of the processing latency until the user terminal generates A/N in response to the DL transmission, the timing of A/N feedback is four ms later the reception of the DL data (after four subframes or after four TTIs).

Each case shown in FIG. 9 to FIG. 11 shows the latency when the TTI duration is 1 ms, 0.5 ms, 0.25 ms, and 0.125 ms (FIGS. 8A to 8D). In addition, as described above, these cases show a case using a fixed special subframe (cases 1-1, 2-1 and 3-1) and a case using a flexible special subframe (cases 1-2, 2-2, 3-2 and 4). Also, FIG. 9 shows a case where the minimum processing latency is three TTIs, FIG. 10 shows a case where the minimum processing latency is two TTIs, and FIG. 11 shows a case where the minimum processing latency is one TTI (case 4 only).

The latencies in FIG. 9 to FIG. 11 correspond to the average latency, and the average latency is determined based on the average signal latency in one trip (one-trip latency), with an addition of 10% of the average HARQ RTT (Round Trip Time), assuming that the error rate of data blocks is controlled to 10%. For example, in case 1-1 in FIG. 9, the TTI duration is one ms, the average DL latency is 5.567 TTIs and the average UL latency is 6.2 TTIs.

Figure 19:
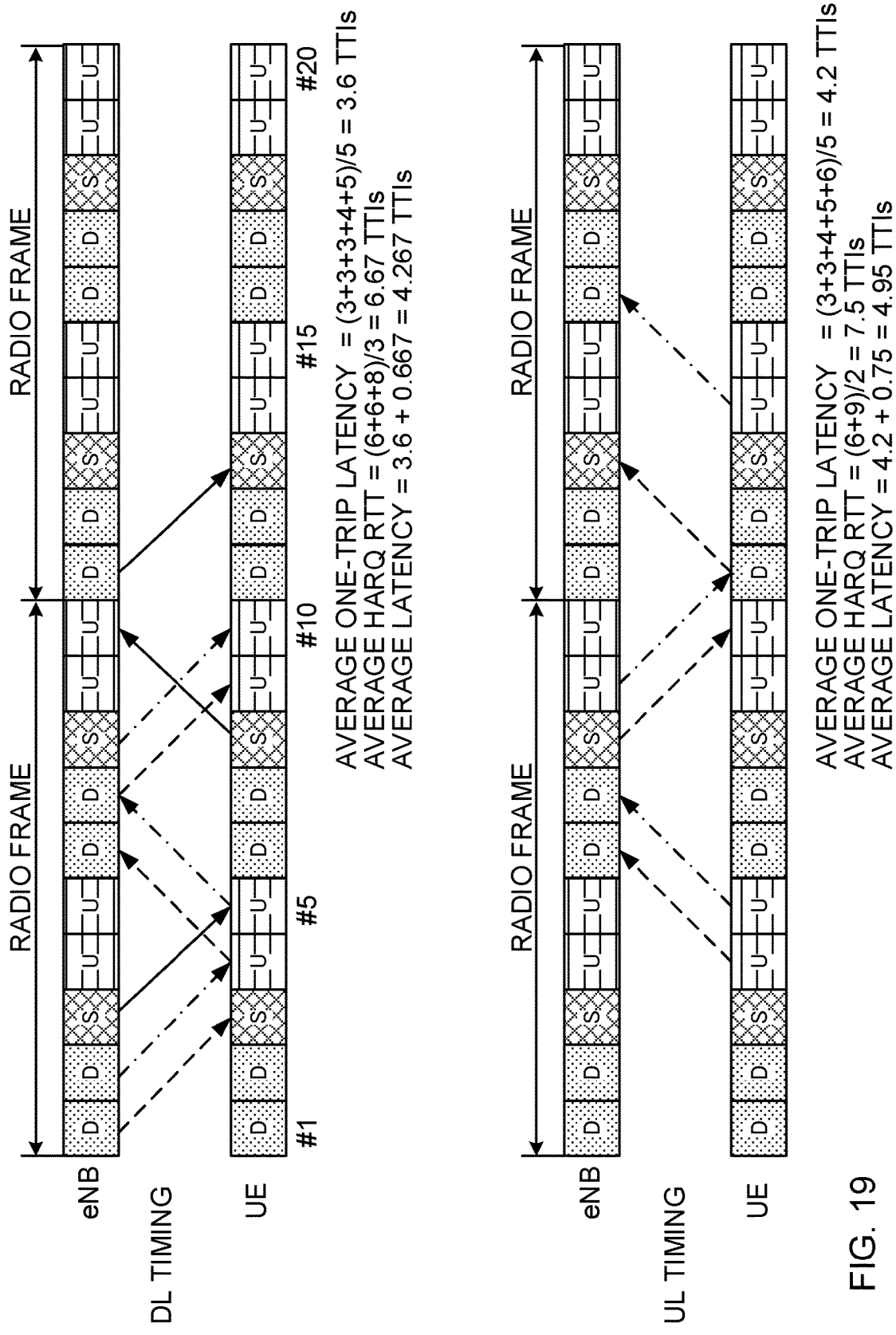
FIG. 19 is a diagram to show results of studying DL/UL latency in TDD.
Figure 20:
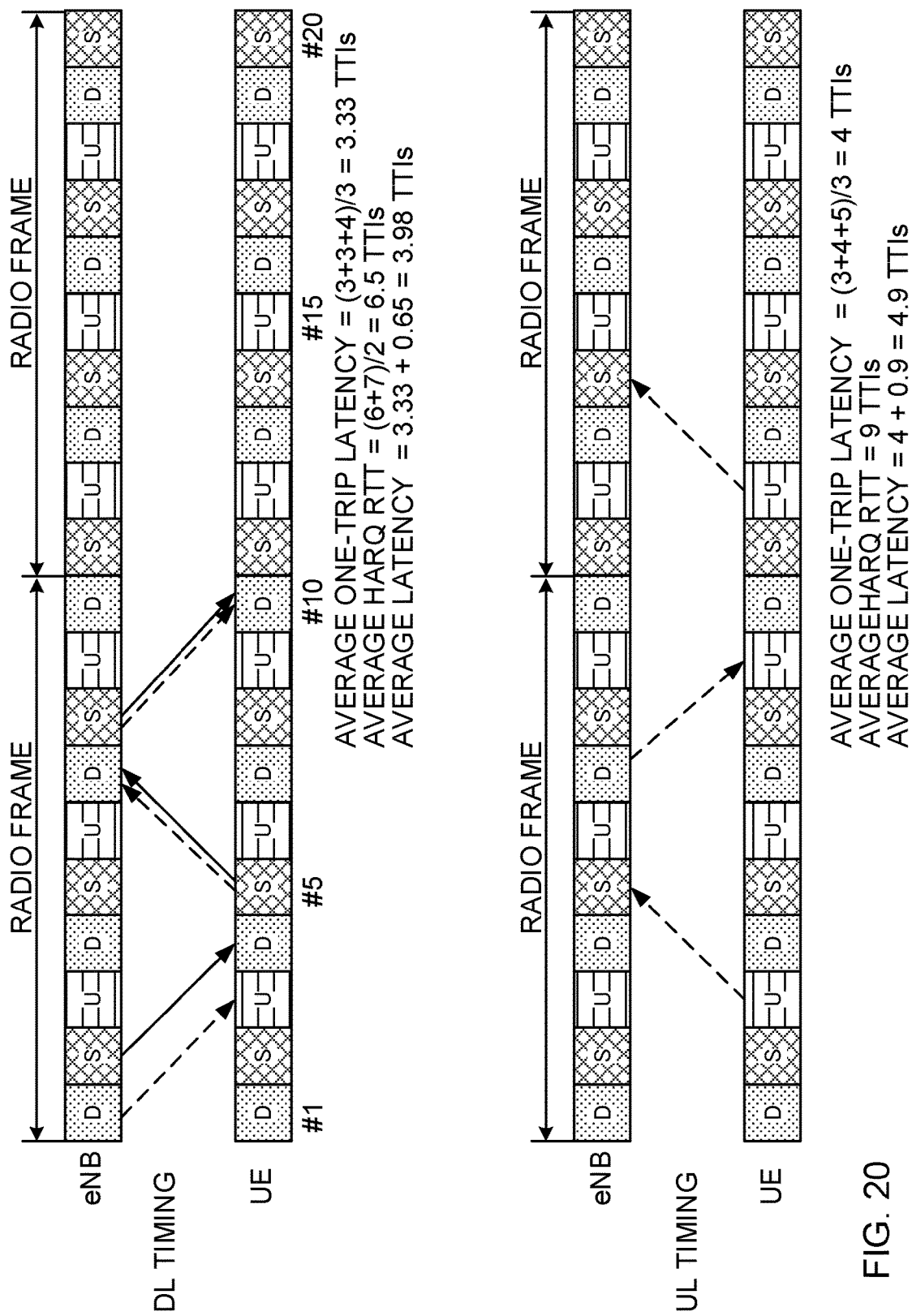
FIG. 20 is a diagram to show results of studying DL/UL latency in TDD.

FIG. 12 to FIG. 18 show the latency in each case where the minimum processing latency is three TTIs (FIG. 9). FIG. 19 to FIG. 21 show the latency in each case where the minimum processing latency is two TTIs (FIG. 10).

FIG. 12 is a diagram to show the DL and UL latencies in case 1-1 (fixed special subframe). In this case, since the minimum processing latency is three TTIs, for example, the A/N in response to the DL transmission in SF #1 is fed back in the UL subframe of SF #4.

In FIG. 12, the average signal latency in one trip (one trip latency) in DL transmission (average one-trip latency) is 4.6 TTIs (=(4+4+4+5+6)/5). This is because in SF #1, SF #2 and SF #3, in which DL data can be scheduled, the latency can be set to four TTIs, while, in SF #4 and SF #5, which are UL subframes, DL data cannot be scheduled and thus additional latencies of two subframes and one subframe respectively occur. In the example shown in FIG. 12, since DL/UL is repeated from SF #1 to SF #5, the average latency is calculated using SF #1 to SF #5.

Also, the average HARQ RTT (average HARQ RTT) is 9.67 TTIs (=(10+10+9)/3). This corresponds to the average latency until DL data allocated to SF #1, SF #2 and SF #3 can be retransmitted. Since the DL data allocated to SF #1, SF #2 and SF #3 can be respectively retransmitted in SF #11, SF #12 and SF #12, these latencies are ten TTIs, ten TTIs and nine TTIs and are the same as the average HARQ RTT calculated based on SF #1 to SF #5.

Taking into account the above-mentioned average one-trip signal latency, the average HARQ RTT and the assumption that block errors occur at a rate of 10% (BLER=10%), the average latency is 5.567 TTI s (=4.6+0.967).

In FIG. 12, the average signal latency in one trip (one-trip latency) in UL transmission is 5.2 TTIs (=(4+4+5+6+7)/5). This is because in SF #4 and SF #5, in which the UL data can be scheduled, the latency can be set to four TTIs, and in SF #1, SF #2, and SF #3, which are DL subframes, UL data cannot be scheduled and thus additional latencies of three subframes, two subframes and one subframe respectively occur. In the example shown in FIG. 12, since DL/UL is repeated from SF #1 to SF #5, the average latency is calculated using SF #1 to SF #5.

Also, the average HARQ RTT (Average HARQ RTT) is ten TTIs (=(10+10)/2). This corresponds to the average latency until UL data allocated to SF #4 and SF #5 can be retransmitted. Since UL data allocated to SF #4 and SF #5 can be respectively retransmitted in SF #14 and SF #15, these latencies are ten TTIs and ten TTIs, and are the same as the average HARQ RTT calculated based on SF #1 to SF #5.

Taking into account the average signal latency in one trip, the average HARQ RTT, and the above assumption that block errors occur at a rate of 10% (BLER=10%), the average latency is 6.2 TTIs (=5.2+1).

For FIG. 13 to FIG. 21 also, latency can be calculated in the same way as in FIG. 12.

As shown in FIG. 9 to FIG. 21, by increasing the number of special subframes to be configured in the radio frame, the latency can be reduced. In addition, latency can be reduced by enabling transmission of UL data channel (or UL control channel) using special subframes.

Note that the present embodiment is not limited to the formats shown in FIG. 9 to FIG. 21, and other subframe formats can also be applied.

(Radio Communication System)

Now, the structure of a radio communication system according to one embodiment of the present invention will be described below. In this radio communication system, communication is performed using any one of or a combination of the radio communication methods according to the above embodiments of the present invention.

Figure 22:
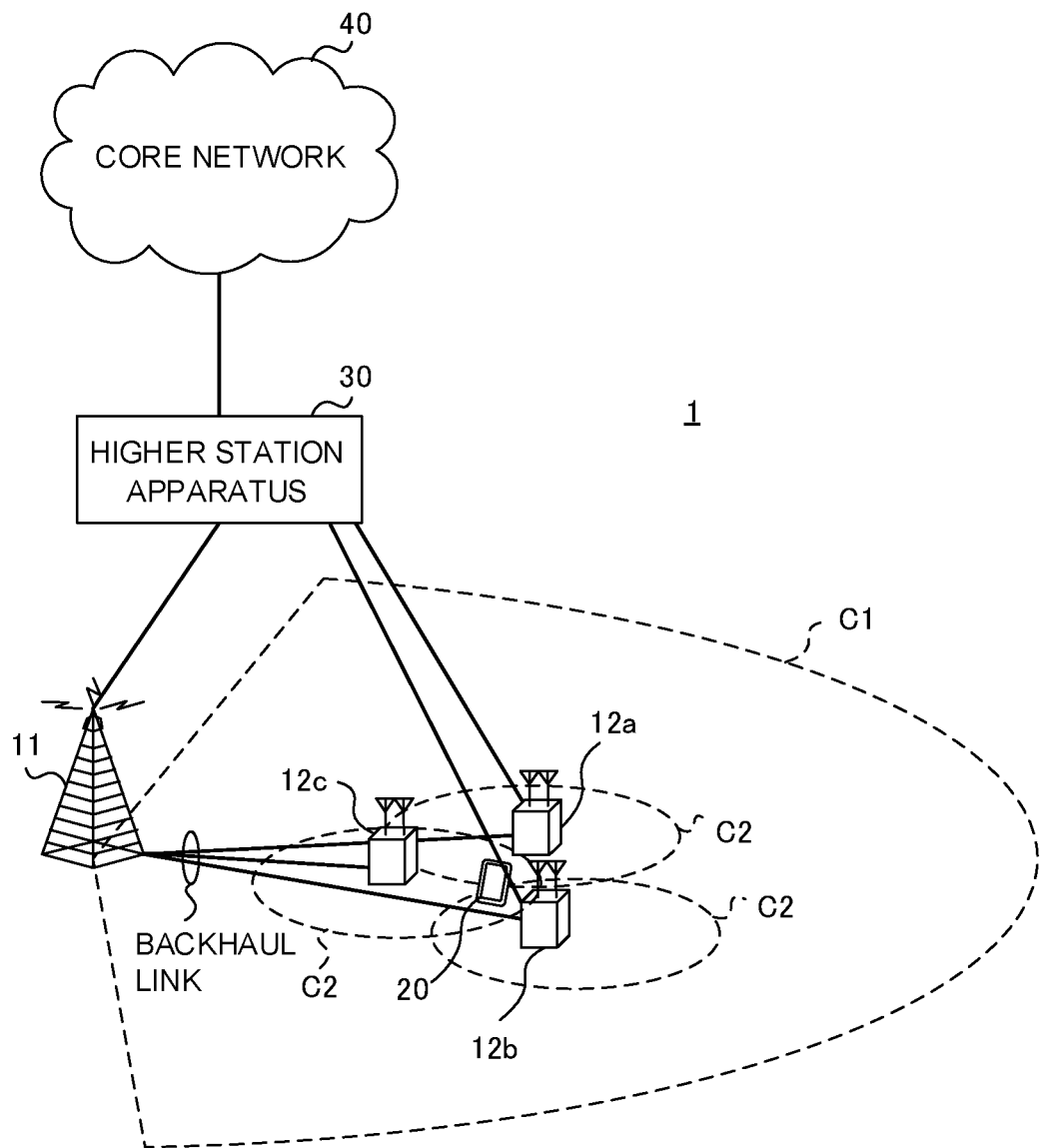
FIG. 22 is a diagram to show an example of a schematic structure of a radio communication system according to one embodiment of the present invention.

FIG. 22 is a diagram to show an example of a schematic structure of a radio communication system according to one embodiment of present invention. A radio communication system 1 can adopt carrier aggregation (CA) and/or dual connectivity (DC) to group a plurality of fundamental frequency blocks (component carriers) into one, where the LTE system bandwidth (for example, 20 MHz) constitutes one unit.

Note that the radio communication system 1 may be referred to as "LTE (Long Term Evolution)," "LTE-A (LTE-Advanced)," "LTE-B (LTE-Beyond)," "SUPER 3G," "IMT-Advanced," "4G (4th generation mobile communication system)," "5G (5th generation mobile communication system)," "FRA (Future Radio Access)," "New-RAT (Radio Access Technology)" and so on, or may be seen as a system to implement these.

The radio communication system 1 shown in FIG. 22 includes a radio base station 11 that forms a macro cell C1, which has a relatively wide coverage, and radio base stations 12 (12a to 12c) that form small cells C2, which are placed within the macro cell C1 and which are narrower than the macro cell C1. Also, user terminals 20 are placed in the macro cell C1 and in each small cell C2.

The user terminals 20 can connect with both the radio base station 11 and the radio base stations 12. The user terminals 20 may use the macro cell C1 and the small cells C2 at the same time by means of CA or DC. Furthermore, the user terminals 20 may apply CA or DC using a plurality of cells (CCs) (for example, five or fewer CCs or six or more CCs).

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz and so on) and a wide bandwidth may be used, or the same carrier as that used in the radio base station 11 may be used. Note that the structure of the frequency band for use in each radio base station is by no means limited to these.

A structure may be employed here in which wire connection (for example, means in compliance with the CPRI (Common Public Radio Interface) such as optical fiber, the X2 interface and so on) or wireless connection is established between the radio base station 11 and the radio base station 12 (or between two radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals (mobile stations) or stationary communication terminals (fixed stations).

In the radio communication system 1, as radio access schemes, orthogonal frequency division multiple access (OFDMA) is applied to the downlink, and single-carrier frequency division multiple access (SC-FDMA) is applied to the uplink. OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are not limited to these combinations, and other radio access schemes may be used.

In the radio communication system 1, a downlink shared channel (PDSCH: Physical Downlink Shared CHannel), which is used by each user terminal 20 on a shared basis, a broadcast channel (PBCH: Physical Broadcast CHannel), downlink L1/L2 control channels and so on are used as downlink channels. User data, higher layer control information and SIBs (System Information Blocks) are communicated in the PDSCH. Also, the MIB (Master Information Block) is communicated in the PBCH.

The downlink L1/L2 control channels include a PDCCH (Physical Downlink Control CHannel), an EPDCCH (Enhanced Physical Downlink Control CHannel), a PCFICH (Physical Control Format Indicator CHannel), a PHICH (Physical Hybrid-ARQ Indicator CHannel) and so on. Downlink control information (DCI), including PDSCH and PUSCH scheduling information, is communicated by the PDCCH. The number of OFDM symbols to use for the PDCCH is communicated by the PCFICH. Delivery acknowledgment information (also referred to as, for example, "retransmission control information," "HARQ-ACKs," "ACK/NACKs," etc.) of HARQ (Hybrid Automatic Repeat reQuest) in response to the PUSCH is transmitted by the PHICH. The EPDCCH is frequency-division-multiplexed with the PDSCH (downlink shared data channel) and used to communicate DCI and so on, like the PDCCH.

In the radio communication system 1, an uplink shared channel (PUSCH: Physical Uplink Shared CHannel), which is used by each user terminal 20 on a shared basis, an uplink control channel (PUCCH: Physical Uplink Control CHannel), a random access channel (PRACH: Physical Random Access CHannel) and so on are used as uplink channels. User data and higher layer control information are communicated by the PUSCH. Also, downlink radio quality information (CQI: Channel Quality Indicator), delivery acknowledgement information and so on are communicated by the PUCCH. By means of the PRACH, random access preambles for establishing connections with cells are communicated.

In the radio communication systems 1, cell-specific reference signal (CRSs), channel state information reference signal (CSI-RSs), demodulation reference signal (DMRSs), positioning reference signal (PRSs) and so on are communicated as downlink reference signals. Also, in the radio communication system 1, measurement reference signals (SRSs: Sounding Reference Signals), demodulation reference signals (DMRSs) and so on are communicated as uplink reference signals. Note that the DMRS may be referred to as a "user terminal-specific reference signal (UE-specific Reference Signal)." Also, the reference signals to be communicated are by no means limited to these.

<Radio Base Station>

Figure 23:
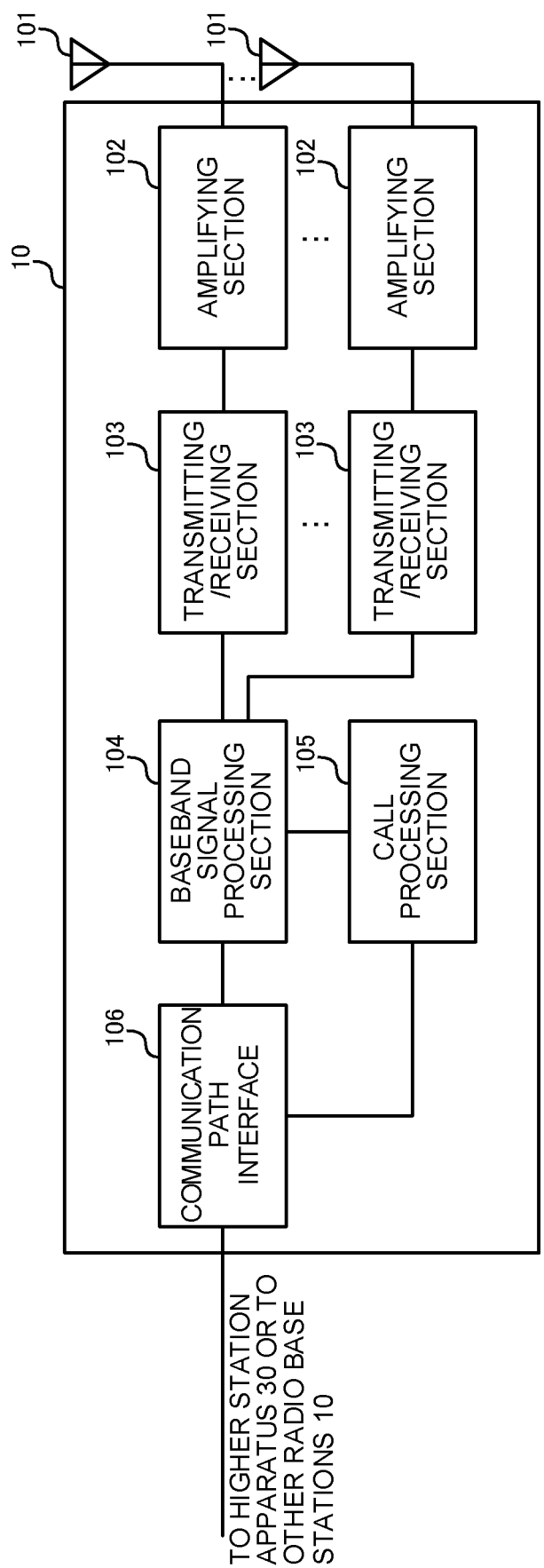
FIG. 23 is a diagram to show an example of an overall structure of a radio base station according to one embodiment of the present invention.

FIG. 23 is a diagram to show an example of an overall structure of a radio base station according to one embodiment of the present invention. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to a PDCP (Packet Data Convergence Protocol) layer process, user data division and coupling, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving section 103. Furthermore, downlink control signals are also subjected to transmission processes such as channel coding and an inverse fast Fourier transform, and forwarded to the transmitting/receiving sections 103.

Baseband signals that are precoded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for uplink signals, radio frequency signals that are received in the transmitting/receiving antennas 101 are each amplified in the amplifying sections 102. The transmitting/receiving sections 103 receive the uplink signals amplified in the amplifying sections 102. The received signals are converted into the baseband signal through frequency conversion in the transmitting/receiving sections 103 and output to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing (such as setting up and releasing communication channels), manages the state of the radio base stations 10 and manages the radio resources.

The communication path interface section 106 transmits and receives signals to and from the higher station apparatus 30 via a predetermined interface. Also, the communication path interface 106 may transmit and receive signals (backhaul signaling) with other radio base stations 10 via an inter-base station interface (which is, for example, optical fiber that is in compliance with the CPRI (Common Public Radio Interface), the X2 interface, etc.).

Note that the transmitting/receiving sections 103 transmit information about the subframe type provided in the flexible subframe and/or information about the data channel format. Further, the transmitting/receiving sections 103 may transmit information about the TTI configuration, information about frequency resources and/or code resources where a downlink control channel is allocated, and suchlike information, to the user terminal 20.

Figure 24:
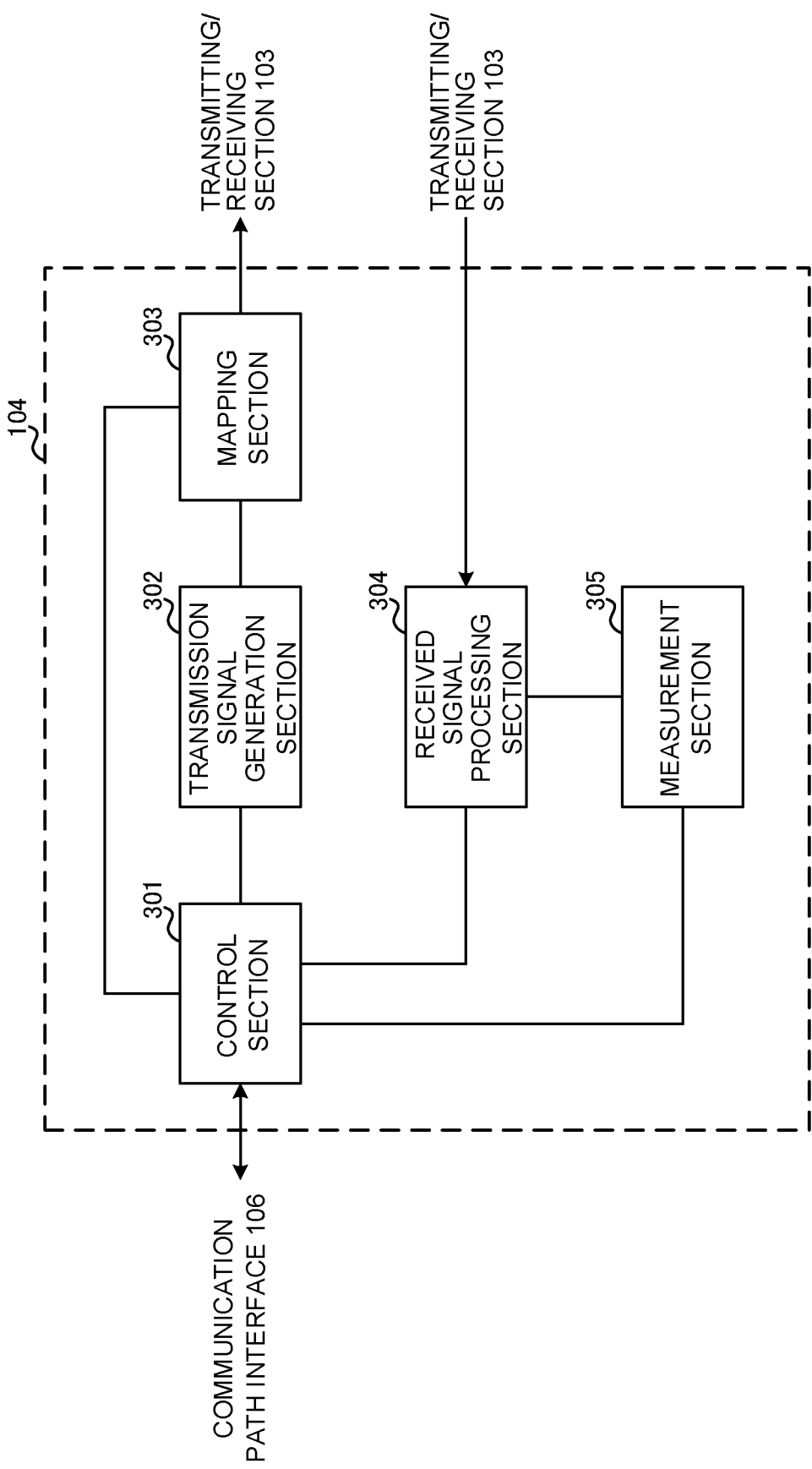
FIG. 24 is a diagram to show an example of a functional structure of a radio base station according to one embodiment of the present invention.

FIG. 24 is a diagram to show an example of a functional structure of a radio base station according to one embodiment of the present invention. Note that, although FIG. 24 primarily shows functional blocks that pertain to characteristic parts of the present embodiment, the radio base station 10 has other functional blocks that are necessary for radio communication as well. As shown in FIG. 24, the baseband signal processing section 104 at least has a control section (scheduler) 301, a transmission signal generation section 302, a mapping section 303, a received signal processing section 304 and a measurement section 305.

The control section (scheduler) 301 controls the whole of the radio base station 10. The control section 301 can be constituted by a controller, a control circuit or control apparatus that can be described based on general understanding of the technical field to which the present invention pertains.

The control section 301, for example, controls the generation of signals in the transmission signal generation section 302, the allocation of signals by the mapping section 303, and so on. Furthermore, the control section 301 controls the signal receiving processes in the received signal processing section 304, the measurements of signals in the measurement section 305, and so on.

The control section 301 controls the scheduling (for example, resource allocation) of downlink data signals that are transmitted in the PDSCH and downlink control signals that are communicated in the PDCCH and/or the EPDCCH. The control section 301 controls the generation of downlink control signals (for example, delivery acknowledgement information and so on) and downlink data signals, based on the results of deciding whether or not retransmission control is necessary for uplink data signals, and so on. Also, the control section 301 controls the scheduling of downlink reference signals such as synchronization signals (for example, the PSS (Primary Synchronization Signal)/SSS (Secondary Synchronization Signal)), the CRS, the CSI-RS, the DM-RS and so on.

In addition, the control section 301 controls the scheduling of uplink data signals that are transmitted in the PUSCH, uplink control signals that are transmitted in the PUCCH and/or the PUSCH (for example, delivery acknowledgment information), random access preambles that are transmitted in the PRACH, uplink reference signals, and so on.

The control section 301 controls transmission and reception based on a first subframe type (for example, a special subframe) including a UL control channel, a DL control channel, a UL data channel and/or a DL data channel in one subframe and a second subframe type (for example, a normal subframe) in which UL communication or DL communication is performed in one subframe.

The transmission signal generation section 302 generates downlink signals (downlink control signals, downlink data signals, downlink reference signals and so on) based on commands from the control section 301, and outputs these signals to the mapping section 303. The transmission signal generation section 302 can be constituted by a signal generator, a signal generating circuit or signal generating apparatus that can be described based on general understanding of the technical field to which the present invention pertains.

For example, the transmission signal generation section 302 generates DL assignments, which report downlink signal allocation information, and UL grants, which report uplink signal allocation information, based on commands from the control section 301. Also, the downlink data signals are subjected to the coding process, the modulation process and so on, by using coding rates and modulation schemes that are determined based on, for example, channel state information (CSI) from each user terminal 20.

The mapping section 303 maps the downlink signals generated in the transmission signal generation section 302 to predetermined radio resources based on commands from the control section 301, and outputs these to the transmitting/receiving sections 103. The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding and so on) of received signals that are input from the transmitting/receiving sections 103. Here, the received signals include, for example, uplink signals transmitted from the user terminals 20 (uplink control signals, uplink data signals, uplink reference signals, etc.). For the received signal processing section 304, a signal processor, a signal processing circuit or signal processing apparatus that can be described based on general understanding of the technical field to which the present invention pertains can be used.

The received signal processing section 304 outputs the decoded information acquired through the receiving processes to the control section 301. For example, when a PUCCH to contain an HARQ-ACK is received, the received signal processing section 304 outputs this HARQ-ACK to the control section 301. Also, the received signal processing section 304 outputs the received signals, the signals after the receiving processes and so on, to the measurement section 305.

The measurement section 305 conducts measurements with respect to the received signals. The measurement section 305 can be constituted by a measurer, a measurement circuit or measurement apparatus that can be described based on general understanding of the technical field to which the present invention pertains.

The measurement section 305 may measure the received power (for example, the RSRP (Reference Signal Received Power)), the received quality (for example, RSRQ (Reference Signal Received Quality)), channel states and so on of the received signals. The measurement results may be output to the control section 301.

(User Terminal)

Figure 25:
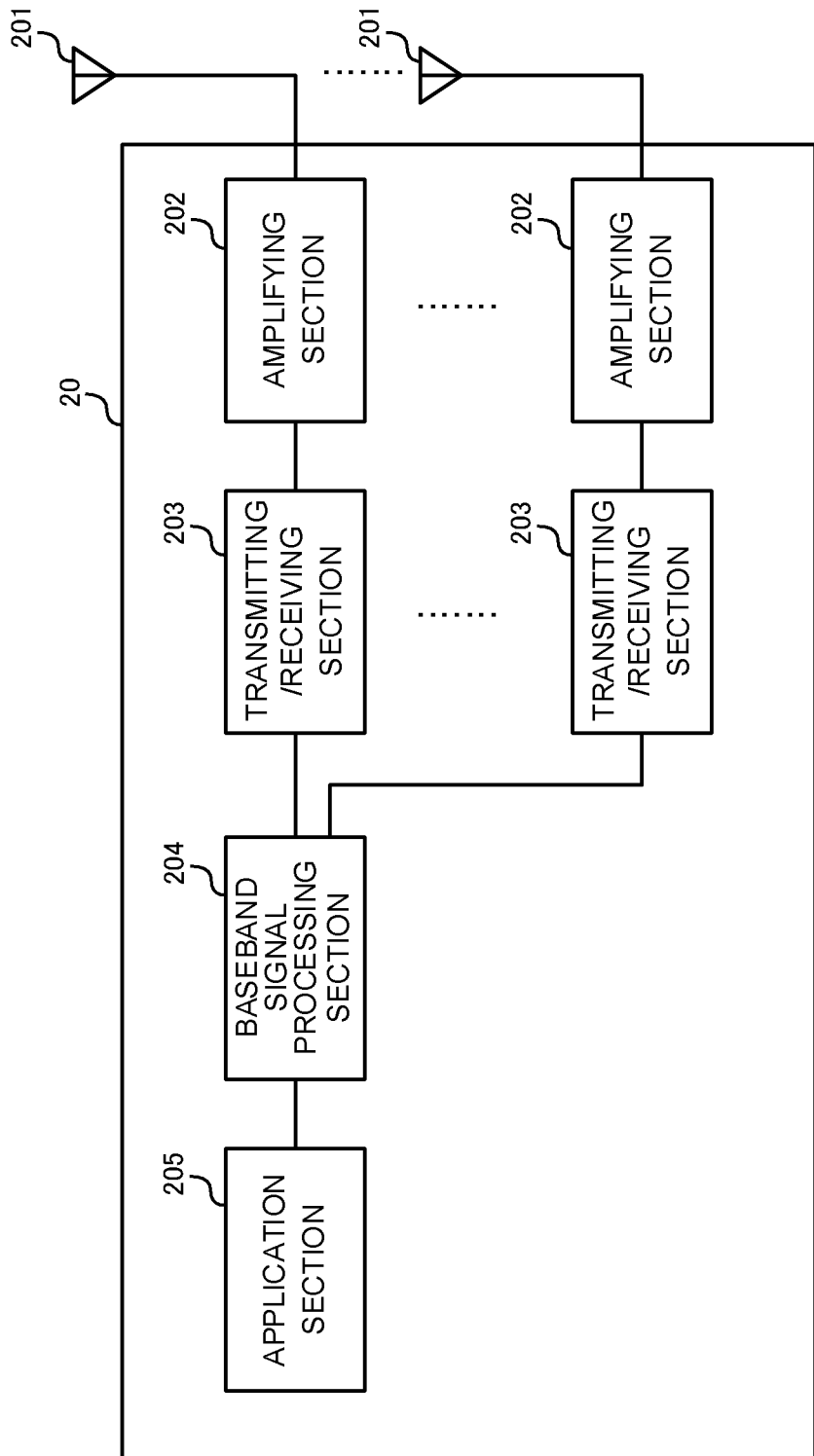
FIG. 25 is a diagram to show an example of an overall structure of a user terminal according to one embodiment of the present invention.

FIG. 25 is a diagram to show an example of an overall structure of a user terminal according to one embodiment of the present invention. A user terminal 20 has a plurality of transmitting/receiving antennas 201, amplifying sections 202, transmitting/receiving sections 203, a baseband signal processing section 204 and an application section 205. Note that one or more transmitting/receiving antennas 201, amplifying sections 202 and transmitting/receiving sections 203 may be provided.

Radio frequency signals that are received in the transmitting/receiving antennas 201 are amplified in the amplifying sections 202. The transmitting/receiving sections 203 receive the downlink signals amplified in the amplifying sections 202. The received signals are subjected to frequency conversion and converted into the baseband signal in the transmitting/receiving sections 203, and output to the baseband signal processing section 204. A transmitting/receiving section 203 can be constituted by a transmitters/receiver, a transmitting/receiving circuit or transmitting/receiving apparatus that can be described based on general understanding of the technical field to which the present invention pertains. Note that a transmitting/receiving section 203 may be structured as a transmitting/receiving section in one entity, or may be constituted by a transmitting section and a receiving section.

In the baseband signal processing section 204, the baseband signal that is input is subjected to an FFT process, error correction decoding, a retransmission control receiving process, and so on. Downlink user data is forwarded to the application section 205. The application section 205 performs processes related to higher layers above the physical layer and the MAC layer, and so on. Furthermore, in the downlink data, broadcast information is also forwarded to the application section 205.

Meanwhile, uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving section 203. Baseband signals that are output from the baseband signal processing section 204 are converted into a radio frequency band in the transmitting/receiving sections 203 and transmitted. The radio frequency signals that are subjected to frequency conversion in the transmitting/receiving sections 203 are amplified in the amplifying sections 202, and transmitted from the transmitting/receiving antennas 201.

Note that the transmitting/receiving section 203 receives information about the subframe type provided in each flexible subframe and/or information about the data channel format (communication direction of data channel). For example, the transmitting/receiving section 203 receives information about the subframe type and/or information about the communication direction of the data channel in a bitmap format. Also, the transmitting/receiving section 203 can receive information about the subframe type and/or information about the communication direction of the data channel at the first subframe included in the radio frame or each subframe in which downlink control information is transmitted.

In addition, the transmitting/receiving section 203 receives information about the length of the gap period that is configured between the UL communication and the DL communication within one subframe and/or the position at which this gap period starts as information about subframe formats of the first subframe type.

Figure 26:
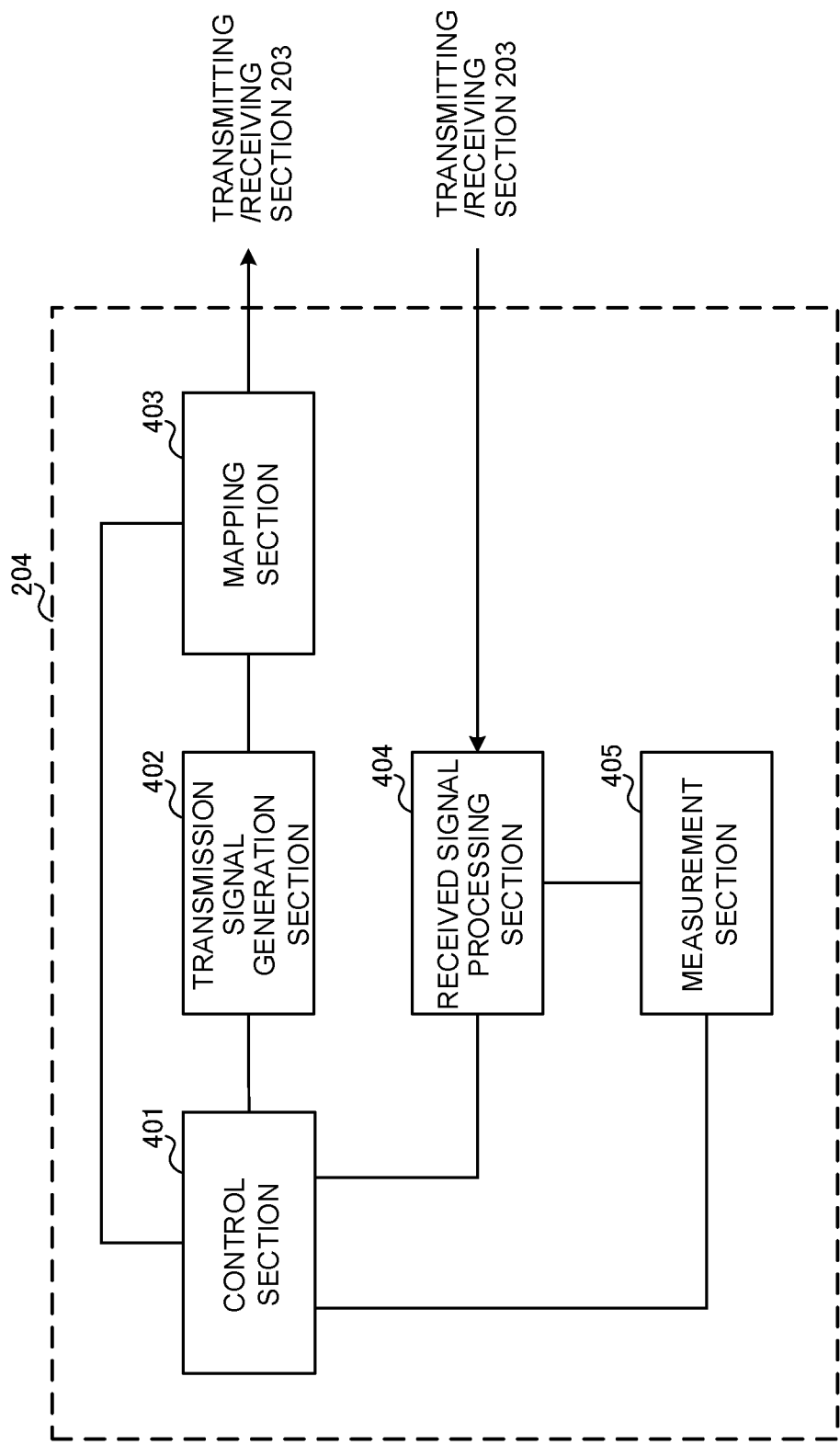
FIG. 26 is a diagram to show an example of a functional structure of a user terminal according to one embodiment of the present invention.

FIG. 26 is a diagram to show an example of a functional structure of a user terminal according to the present embodiment. Note that, although FIG. 26 primarily shows functional blocks that pertain to characteristic parts of the present embodiment, the user terminal 20 has other functional blocks that are necessary for radio communication as well. As shown in FIG. 26, the baseband signal processing section 204 provided in the user terminal 20 at least has a control section 401, a transmission signal generation section 402, a mapping section 403, a received signal processing section 404 and a measurement section 405.

The control section 401 controls the whole of the user terminal 20. For the control section 401, a controller, a control circuit or control apparatus that can be described based on general understanding of the technical field to which the present invention pertains can be used.

The control section 401, for example, controls the generation of signals in the transmission signal generation section 402, the allocation of signals by the mapping section 403, and so on. Furthermore, the control section 401 controls the signal receiving processes in the received signal processing section 404, the measurements of signals in the measurement section 405, and so on.

The control section 401 acquires the downlink control signals (signals transmitted in the PDCCH/EPDCCH) and downlink data signals (signals transmitted in the PDSCH) transmitted from the radio base station 10, via the received signal processing section 404. The control section 401 controls the generation of uplink control signals (for example, delivery acknowledgement information and so on) and/or uplink data signals based on the results of deciding whether or not retransmission control is necessary for the downlink control signals and/or downlink data signals, and so on.

The control section 401 controls transmission/reception based on a first subframe type (for example, a special subframe) including a UL control channel, a DL control channel, a UL data channel and/or a DL data channel in one subframe and a second subframe type (for example, a normal subframe) in which UL communication or DL communication is performed in one subframe.

The transmission signal generation section 402 generates uplink signals (uplink control signals, uplink data signals, uplink reference signals, etc.) based on commands from the control section 401, and outputs these signals to the mapping section 403. The transmission signal generation section 402 can be constituted by a signal generator, a signal generating circuit or signal generating apparatus that can be described based on general understanding of the technical field to which the present invention pertains.

For example, the transmission signal generation section 402 generates uplink control signals related to delivery acknowledgement information, channel state information (CSI) and so on, based on commands from the control section 401. Also, the transmission signal generation section 402 generates uplink data signals based on commands from the control section 401. For example, when a UL grant is included in a downlink control signal that is reported from the radio base station 10, the control section 401 commands the transmission signal generation section 402 to generate an uplink data signal.

The mapping section 403 maps the uplink signals generated in the transmission signal generation section 402 to radio resources based on commands from the control section 401, and output the result to the transmitting/receiving section 203. The mapping section 403 can be constituted by a mapper, a mapping circuit or mapping apparatus that can be described based on general understanding of the technical field to which the present invention pertains.

The received signal processing section 404 performs receiving processes (for example, demapping, demodulation, decoding and so on) of received signals that are input from the transmitting/receiving sections 203. Here, the received signals include, for example, downlink signals (downlink control signals, downlink data signals, downlink reference signals and so on) that are transmitted from the radio base station 10. The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

The received signal processing unit 404 performs blind decoding on the DCI (DCI format) for scheduling transmission and/or reception of data (TB: Transport Block) based on commands from the control section 401.

The received signal processing section 404 outputs the decoded information, acquired through the receiving processes, to the control section 401. The received signal processing section 404 outputs, for example, broadcast information, system information, RRC signaling, DCI and so on, to the control section 401. The received signal processing section 404 may output the decoding result of the data to the control section 401. Also, the received signal processing section 404 outputs the received signals, the signals after the receiving processes and so on, to the measurement section 405.

The measurement section 405 conducts measurements with respect to the received signals. The measurement section 405 can be constituted by a measurer, a measurement circuit or measurement apparatus that can be described based on general understanding of the technical field to which the present invention pertains.

The measurement section 405 may measure, for example, the received power (for example, RSRP), the received quality (for example, RSRQ), the channel states and so on of the received signals. The measurement results may be output to the control section 401.

(Hardware Structure)

Note that the block diagrams that have been used to describe the above embodiments show blocks in functional units. These functional blocks (components) may be implemented in arbitrary combinations of hardware and/or software. Also, the means for implementing each functional block is not particularly limited. That is, each functional block may be implemented with 1 piece of physically-integrated apparatus, or may be implemented by connecting 2 physically-separate pieces of apparatus via radio or wire and by using these multiple pieces of apparatus.

Figure 27:
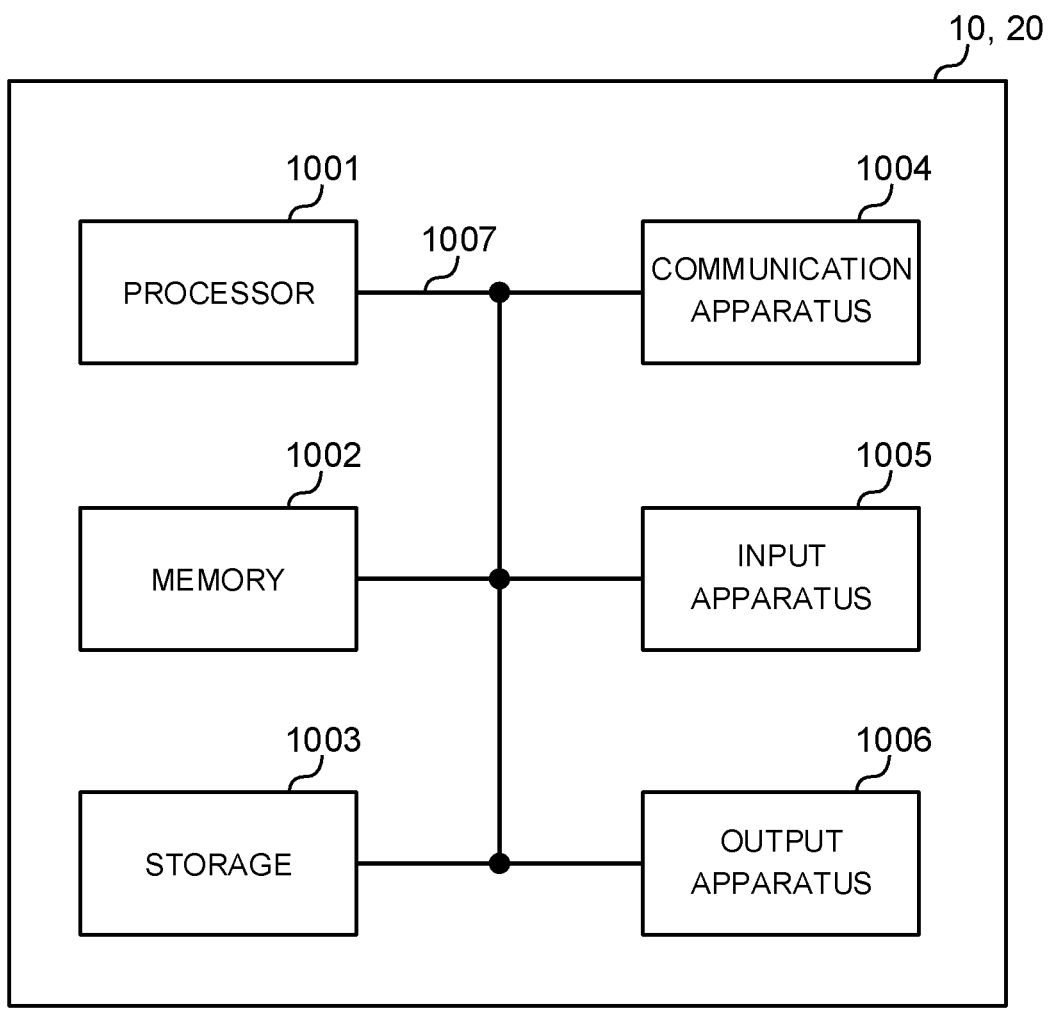
FIG. 27 is a diagram to show an example hardware structure of a radio base station and a user terminal according to one embodiment of the present invention.

That is, a radio base station, a user terminal and so on according to one embodiment of the present invention may function as a computer that executes the processes of the radio communication method of the present invention. FIG. 27 is a diagram to show an example hardware structure of a radio base station and a user terminal according to one embodiment of the present invention. Physically, the above-described radio base stations 10 and user terminals 20 may be formed as a computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal 20 may be designed to include one or more of each apparatus shown in the drawings, or may be designed not to include part of the apparatus.

Each function of the radio base station 10 and the user terminal 20 is implemented by reading predetermined software (program) on hardware such as the processor 1001 and the memory 1002, and by controlling the calculations in the processor 1001, the communication in the communication apparatus 1004, and the reading and/or writing of data in the memory 1002 and the storage 1003.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal processing section 104 (204), call processing section 105 and so on may be implemented by the processor 1001.

Furthermore, the processor 1001 reads programs (program codes), software modules or data, from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), a RAM (Random Access Memory) and so on. The memory 1002 may be referred to as a "register," a "cache," a "main memory (primary storage apparatus)" and so on. The memory 1002 can store executable programs (program codes), software modules and the like for implementing the radio communication methods according to one embodiment of the present invention.

The storage 1003 is a computer-readable recording medium, and is configured with at least one of an optical disk such as a CD-ROM (Compact Disc ROM), a hard disk drive, a flexible disk, a magneto-optical disk, a flash memory and so on. The storage 1003 may be referred to as "secondary storage apparatus."

The communication apparatus 1004 is hardware (transmitting/receiving device) for allowing inter-computer communication by using wired and/or wireless networks, and may be referred to as, for example, a "network device," a "network controller," a "network card," a "communication module" and so on. For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, etc.). The output apparatus 1006 is an output device for sending output to the outside (for example, a display, a speaker, etc.). Note that the input apparatus 1005 and the output apparatus 1006 may be provided in an integrated structure (for example, a touch panel).

Furthermore, these types of apparatus, including the processor 1001 and the memory 1002 and others, are connected by a bus 1007 for communicating information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

Note that the terminology used in this specification and the terminology that is needed to understand this specification may be replaced by other terms that convey the same or similar meanings. For example, "channels" and/or "symbols" may be replaced by "signals (or "signaling")." Also, "signals" may be "messages." Furthermore, a "component carrier (CC)" may be referred to as a "cell," a "frequency carrier," a "carrier frequency" and so on.

Furthermore, a radio frame may be composed of one or more periods (frames) in the time domain. Each of one or more periods (frames) constituting a radio frame may be referred to as a "subframe." Furthermore, a subframe may be composed of one or more slots in the time domain. Furthermore, a slot may be comprised of 1 or multiple symbols (OFDM symbols, SC-FDMA symbols, etc.) in the time domain.

A radio frame, a subframe, a slot and a symbol all represent the time unit in signal communication. A radio frames, a subframe, a slot and a symbol may be each called by other applicable names. For example, one subframe may be referred to as a "transmission time interval (TTI)," or a plurality of consecutive subframes may be referred to as a "TTI," and one slot may be referred to as a "TTI." That is, a subframe and a TTI may be a subframe (one ms) in existing LTE, may be a shorter period than one ms (for example, one to thirteen symbols), or may be a longer period of time than one ms.

Here, a TTI refers to the minimum time unit of scheduling in radio communication, for example. For example, in LTE systems, a radio base station schedules the allocation of radio resources (such as the frequency bandwidth and transmission power that can be used by each user terminal) for each user terminal in TTI units. Note that the definition of TTIs is not limited to this.

A TTI having a time duration of one ms may be referred to as a "normal TTI (TTI in LTE Rel. 8 to 12)," a "long TTI," a "normal subframe," a "long subframe," etc. A TTI that is shorter than a normal TTI may be referred to as a "shortened TTI," a "short TTI," a "shortened subframe," a "short subframe," or the like.

A resource block (RB) is the unit of resource allocation in the time domain and the frequency domain, and may include one or a plurality of consecutive subcarriers in the frequency domain. Also, an RB may include one or more symbols in the time domain, and may be one slot, one subframe or one TTI in length. One TTI and one subframe each may be composed of one or more resource blocks. Note that an RB may be referred to as a "physical resource block (PRB: Physical RB)," a "PRB pair," an "RB pair," or the like.

Furthermore, a resource block may be comprised of one or more resource elements (REs). For example, one RE may be a radio resource field of one subcarrier and one symbol.

Note that the above-described structures of radio frames, subframes, slots, symbols and so on are merely examples. For example, configurations such as the number of subframes included in a radio frame, the number of slots included in a subframe, the number of symbols and RBs included in a slot, the number of subcarriers included in an RB, the number of symbols in a TTI, the symbol duration and the cyclic prefix (CP) length can be variously changed.

Also, the information and parameters described in this specification may be represented in absolute values or in relative values with respect to predetermined values, or may be represented in other information formats. For example, radio resources may be specified by predetermined indices.

The information, signals and/or others described in this specification may be represented by using a variety of different technologies. For example, data, instructions, commands, information, signals, bits, symbols and chips, all of which may be referenced throughout the herein-included description, may be represented by voltages, currents, electromagnetic waves, magnetic fields or particles, optical fields or photons, or any combination of these.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation and microwaves), these wired technologies and/or wireless technologies are also included in the definition of communication media.

Furthermore, the radio base stations in this specification may be interpreted as user terminals. For example, each aspect/embodiment of the present invention may be applied to a configuration in which communication between a radio base station and a user terminal is replaced with communication among a plurality of user terminals (D2D: Device-to-Device). In this case, user terminals 20 may have the functions of the radio base stations 10 described above. In addition, wording such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

The examples/embodiments illustrated in this specification may be used individually or in combinations, which may be switched depending on the mode of implementation. Also, predetermined information (for example, reporting of information to the effect that "X holds") does not necessarily have to be reported explicitly, and can be reported in an implicit manner (by, for example, not reporting this piece of information).

Reporting of information is by no means limited to the examples/embodiments described in this specification, and other methods may be used as well. For example, reporting of information may be implemented by using physical layer signaling (for example, DCI (Downlink Control Information) and UCI (Uplink Control Information)), higher layer signaling (for example, RRC (Radio Resource Control) signaling, broadcast information (the MIB (Master Information Blocks) and SIBs (System Information Blocks) and so on) and MAC (Medium Access Control) signaling, other signals or combinations of these.

Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

The aspects/embodiments illustrated in this specification may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate systems and/or next-generation systems that are enhanced based on these.

The order of processes, sequences, flowcharts and so on that have been used to describe the aspects/embodiments herein may be re-ordered as long as inconsistencies do not arise. For example, although various methods have been illustrated in this specification with various components of steps in exemplary orders, the specific orders that are illustrated herein are by no means limiting.

Now, although the present invention has been described in detail above, it should be obvious to a person skilled in the art that the present invention is by no means limited to the embodiments described herein. For example, the above-described embodiments may be used individually or in combinations. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The invention claimed is:

1. A terminal comprising:
   a receiver that performs, by using one of a first time interval and a second time interval, a receiving process for downlink control information indicating a transmission direction per symbol; and
   a processor that determines the transmission direction based on the downlink control information,
   wherein the first time interval is in units of slots and the second time interval is in units of radio frames.

2. A radio communication method for a terminal comprising:
  the terminal being configured to use a first time interval or a second time interval;
  performing, by using one of the first time interval or the second time interval, a receiving process for downlink control information indicating a transmission direction per symbol; and
  determining the transmission direction based on the downlink control information,
  wherein the first time interval is in units of slots and the second time interval is in units of radio frames.

3. A base station comprising:
  a transmitter that performs, by using one of a first time interval and a second time interval, a transmitting process for downlink control information indicating a transmission direction per symbol; and
  a processor that controls a notification of the transmission direction based on the downlink control information,
  wherein the first time interval is in units of slots and the second time interval is in units of radio frames.

4. A system station comprising a base station and a terminal, wherein:
  the base station comprises:
    a transmitter that performs, by using one of a first time interval and a second time interval, a transmitting process for downlink control information indicating a transmission direction per symbol; and
    a processor that controls a notification of the transmission direction based on the downlink control information,
  the terminal comprises:
    a receiver that performs, by using one of the first time interval and the second time interval, a receiving process for the downlink control information indicating the transmission direction per the symbol; and
    a processor that determines the transmission direction based on the downlink control information,
  wherein the first time interval is in units of slots and the second time interval is in units of radio frames.

* * * * *